US00RE50609E

(19) United States
(12) Reissued Patent
Tkadlec et al.

(10) Patent Number: US RE50,609 E
(45) Date of Reissued Patent: *Sep. 30, 2025

(54) FILTER ASSEMBLIES, TUNING ELEMENTS AND METHOD OF TUNING A FILTER

(71) Applicant: CommScope Italy S.r.l., Agrate Brianza (IT)

(72) Inventors: Roman Tkadlec, Valasske Kiobouky (CZ); Yongjie Xu, Shanghai (CN); Richard Brown, Forest, VA (US); Giuseppe Resnati, Seregno (IT); Omar Parimbelli, Lallio (IT); Sammit Patel, Richardson, TX (US)

(73) Assignee: Outdoor Wireless Networks LLC, Richardson, TX (US)

( * ) Notice: This patent is subject to a terminal disclaimer.

(21) Appl. No.: 18/086,978

(22) Filed: Dec. 22, 2022

Related U.S. Patent Documents

Reissue of:
(64) Patent No.: 10,879,576
Issued: Dec. 29, 2020
Appl. No.: 16/674,240
Filed: Nov. 5, 2019

U.S. Applications:
(63) Continuation of application No. 16/039,366, filed on Jul. 19, 2018, now Pat. No. 10,530,027, which is a
(Continued)

(30) Foreign Application Priority Data

Nov. 13, 2015 (CN) ..... 201511036066.7
Jul. 26, 2016 (CN) ..... 201610596975.4

(51) Int. Cl.
*H01P 1/207* (2006.01)
*H01P 1/203* (2006.01)
(Continued)

(52) U.S. Cl.
CPC ..... *H01P 1/207* (2013.01); *H01P 1/20345* (2013.01); *H01P 1/2135* (2013.01);
(Continued)

(58) Field of Classification Search
CPC ..... H01P 1/203; H01P 1/20345; H01P 1/205; H01P 1/207; H01P 1/213; H01P 1/2135;
(Continued)

(56) References Cited

U.S. PATENT DOCUMENTS 4,488,132 A 12/1984 Collins et al.
5,028,896 A 7/1991 Kuokkanen
(Continued)

FOREIGN PATENT DOCUMENTS

CN 1476735 2/2004
CN 1476735 A 2/2004
(Continued)

OTHER PUBLICATIONS

"Notification of First Office Action (with translation), corresponding to Chinese Patent Application No. 201610596975.4, mailed Oct. 9, 2018".
(Continued)

*Primary Examiner* — My Trang Ton
(74) *Attorney, Agent, or Firm* — Myers Bigel, P.A.

(57) ABSTRACT

The present invention provides filter assemblies, tuning elements and a method of tuning a filter. A filter assembly includes a housing having a top cover, a bottom cover and at least one sidewall, the top cover, the bottom cover and the at least one sidewall defining an internal cavity, the housing configured to receive first through third radio frequency ("RF") transmission lines; a top metal sheet mounted within the internal cavity that has a plurality of openings that form a first hole pattern; and a bottom metal sheet mounted within the internal cavity that has a plurality of openings that form
(Continued)

a second hole pattern. The top and bottom metal sheets are vertically spaced-apart from each other in a vertically stacked relationship within the internal cavity. The top metal sheet and the bottom metal sheet each include at least one resonator.

20 Claims, 30 Drawing Sheets

Related U.S. Application Data continuation of application No. 15/349,559, filed on Nov. 11, 2016, now Pat. No. 10,050,323.

(60) Provisional application No. 62/377,082, filed on Aug. 19, 2016.

(51) Int. Cl.
*H01P 1/213* (2006.01)
*H01P 7/06* (2006.01)
*H01P 7/08* (2006.01)

(52) U.S. Cl.
CPC ..... *H01P 1/2138* (2013.01); *H01P 7/06* (2013.01); *H01P 7/088* (2013.01)

(58) Field of Classification Search
CPC ..... H01P 1/2136; H01P 1/2138; H01P 3/088; H01P 7/06; H01P 7/08; H01P 7/082; H01P 7/088
USPC ..... 333/185, 203
See application file for complete search history.

(56) References Cited

U.S. PATENT DOCUMENTS

| | | | | |
|---|---|---|---|---|
| 5,329,687 | A * | 7/1994 | Scott | C23C 18/38 333/202 |
| 5,352,996 | A | 10/1994 | Kawaguchi | |
| 5,550,519 | A | 8/1996 | Korpela | |
| 5,905,416 | A | 5/1999 | Schmid et al. | |
| 5,959,511 | A | 9/1999 | Pasco et al. | |
| 6,111,484 | A | 8/2000 | Henningsson et al. | |
| 6,198,363 | B1 | 3/2001 | Vuoppola et al. | |
| 6,255,917 | B1 * | 7/2001 | Scott | H01P 11/007 333/202 |
| 6,329,949 | B1 | 12/2001 | Barnett et al. | |
| 6,384,699 | B1 | 5/2002 | Henningsson et al. | |
| 6,414,250 | B1 | 7/2002 | Inoue et al. | |
| 10,050,323 | B2 * | 8/2018 | Tkadlec | H01P 1/207 |
| 2001/0038701 | A1 | 11/2001 | Corynen | |
| 2005/0040913 | A1 | 2/2005 | Galaz et al. | |
| 2008/0315969 | A1 | 12/2008 | Tascone et al. | |
| 2009/0128263 | A1 | 5/2009 | Hesselbarth | |
| 2011/0121919 | A1 | 5/2011 | Tachibana et al. | |
| 2011/0227673 | A1 | 9/2011 | Patrick et al. | |
| 2012/0068789 | A1 | 3/2012 | Jones et al. | |
| 2013/0271243 | A1 | 10/2013 | Haunberger et al. | |
| 2014/0077899 | A1 | 3/2014 | Huang | |
| 2015/0280318 | A1 | 10/2015 | Yang | |
| 2015/0288043 | A1 * | 10/2015 | Buchauer | H01P 1/2053 333/207 |

FOREIGN PATENT DOCUMENTS

| | | | |
|---|---|---|---|
| CN | 1518012 | | 8/2004 |
| CN | 1518012 | A | 8/2004 |
| CN | 101048257 | | 10/2007 |
| CN | 101048257 | A | 10/2007 |
| CN | 101378142 | | 3/2009 |
| CN | 101378142 | A | 3/2009 |
| CN | 102904000 | | 1/2013 |
| CN | 102904000 | A | 1/2013 |
| CN | 103035988 | | 4/2013 |
| CN | 103035988 | A | 4/2013 |
| CN | 103262338 | | 8/2013 |
| CN | 103262338 | A | 8/2013 |
| CN | 104126247 | | 10/2014 |
| CN | 104126247 | A | 10/2014 |
| WO | 201329817 | | 2/2013 |
| WO | 2013029817 | A1 | 3/2013 |

OTHER PUBLICATIONS

"Notification of Second Office Action (with translation), corresponding to Chinese Patent Application No. 201610596975.4, mailed Jun. 4, 2019.".

"Notification of Transmittal of the International Search Report and the Written Opinion of the International Searching Authority or the Declaration, for PCT/CN2016/105712, Feb. 21, 2017, pp. 12 pages".

"Supplementary European Search Report in corresponding European Application No. 16863701.5-1205 (Jun. 6, 2019)".

Huang Wang et al., "An Inline Coaxial Quasi-Elliptic Filter With Controllable Mixed Electric and Magnetic Coupling," IEEE Transactions on Microwave Theory and Techniques, vol. 57, No. 3, Mar. 2009, pp. 667-673.

Qing-Xin Chu et al., "A Compact Open-Loop Filter With Mixed Electric and Magnetic Coupling," IEEE Transactions on Microwave Theory and Techniques, vol. 56, No. 2, Feb. 2008, pp. 431-439.

* cited by examiner

FILTER ASSEMBLIES, TUNING ELEMENTS AND METHOD OF TUNING A FILTER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

The present application *is a reissue of U.S. patent application Ser. No. 16/674,240, filed Nov. 5, 2019, which* claims priority under 35 U.S.C. § 120 as a continuation of U.S. patent application Ser. No. 16/039,366, filed Jul. 19, 2018, which is a continuation of U.S. patent application Ser. No. 15/349,559, filed Nov. 11, 2016 now U.S. Pat. No. 10,050,323, issued Aug. 14, 2018), and from U.S. Provisional Patent Application Ser. No. 62/377,082, filed Aug. 19, 2016, which in turn claims priority under 35 U.S.C. § 119 from Chinese Patent Application Serial No. 201511036066.7, filed Nov. 13, 2015, and from Chinese Patent Application Serial No. 201610596975.4, filed Jul. 26, 2016, the entire content of each of which is incorporated herein by reference in their entireties.

FIELD OF THE INVENTION

The present invention relates generally to communications systems and, more particularly, to filters that are suitable for use in cellular communications systems.

BACKGROUND

Wireless base stations are well known in the art and typically include, among other things, baseband equipment, radios and antennas. The antennas are often mounted at the top of a tower or other elevated structure such as a pole, rooftop, water tower or the like. Typically, multiple antennas are mounted on the tower, and a separate baseband unit and radio are connected to each antenna. Each antenna provides cellular service to a defined coverage area or "sector."

FIG. 1 is a highly simplified, schematic diagram that illustrates a conventional cellular base station 10. As shown in FIG. 1, the cellular base station 10 includes an antenna tower 30 and an equipment enclosure 20 that is located at the base of the antenna tower 30. A plurality of baseband units 22 and radios 24 are located within the equipment enclosure 20. Each baseband unit 22 is connected to a respective one of the radios 24 and is also in communication with a backhaul communications system 44. Three sectorized antennas 32 (labelled antennas 32-1, 32-2, 32-3) are located at the top of the antenna tower 30. Three coaxial cables 34 (which are bundled together in FIG. 1 to appear as a single cable) connect the radios 24 to the respective antennas 32. Each end of each coaxial cable 34 may be connected to a duplexer (not shown) so that both the transmit and receive signals for each radio 24 may be carried on a single coaxial cable 34. It will be appreciated that in many cases the radios 24 are located at the top of the tower 30 instead of in the equipment enclosure 20 in order to reduce signal transmission losses.

Cellular base stations typically use directional antennas 32 such as phased array antennas to provide increased antenna gain throughout a defined coverage area. A typical phased array antenna 32 may be implemented as a linear array of radiating elements mounted on a panel, with perhaps ten radiating elements per linear array. Typically, each radiating element is used to (1) transmit radio frequency ("RF") signals that are received from a transmit port of an associated radio 24 and (2) receive RF signals from mobile users and feed such received signals to the receive port of the associated radio 24. Duplexers are typically used to connect the radio 24 to each respective radiating element of the antenna 32. A "duplexer" refers to a well-known type of three-port filter assembly that is used to connect both the transmit and receive ports of a radio 24 to an antenna 32 or to a radiating element of multi-element antenna 32. Duplexers are used to isolate the RF transmission paths to the transmit and receive ports of the radio 24 from each other while allowing both RF transmission paths access to the radiating element of the antenna 32, and may accomplish this even though the transmit and receive frequency bands may be closely spaced together.

In order to transmit RF signals to, and receive RF signals from, a defined coverage area, each directional antenna 32 is typically mounted to face in a specific direction (referred to as "azimuth") relative to a reference such as true north, to be inclined at a specific downward angle with respect to the horizontal in the plane of the azimuth (referred to as "tilt" or "elevation"), and to be vertically aligned with respect to the horizontal (referred to as "roll"). Unintended changes in azimuth, tilt, and roll can detrimentally affect the coverage of a directional antenna 32. Unfortunately, high winds, vibrations, corrosion or various other factors may cause the azimuth, tilt and/or roll of an antenna 32 to change over time. Accordingly, wireless service providers may monitor antennas 32 at cellular base stations 10 to identify when antennas 32 are no longer pointed in a desired direction.

In some cases, the antennas 32 may be mounted on motorized gimbals, and hence an operator can adjust the pointing direction of the antenna 32 from a remote location by sending control signals to the motorized gimbal. Additionally, some antennas 32 are designed so that the "electronic tilt" of the antenna 32 may be adjusted from a remote location. With antennas 32 that include such an electronic tilt capability, the physical orientation of the antenna 32 is fixed, but the effective angle of the antenna beam can be adjusted electronically by, for example, controlling phase shifters that adjust the phase of the signal fed to each radiating element of the antenna 32. The phase shifters and other related circuitry are typically built into the antenna 32 and can be controlled from a remote location. Typically, the phase shifters are controlled using Antenna Interface Standards Group ("AISG") control signals, which are an industry standardized set of control signals used for controlling antennas used in cellular communications systems. Typically, the electronic adjustment of the antenna beam is used to change the downward angle or "tilt" of the antenna beam. Antennas 32 having beam patterns whose tilt angle can be adjusted electronically from a remote location are typically referred to as Remote Electronic Tilt ("RET") antennas.

With RET antennas, a first phase shifter is used for the transmit frequency band and a second phase shifter is used for the receive frequency band. As separate transmit and receive phase shifters are used, the duplexers that are used to allow each radiating element to both transmit and receive signals must necessarily be located along the transmission path between the phase shifters and the radiating elements. With RET antennas, the phase shifters are typically mounted on the back side of the antenna panel, in very close proximity to the radiating elements. Consequently, the duplexers are also typically mounted on the back side of the antenna panel. As the number of radiating elements has increased (to provide better antenna gain patterns), this has made it more difficult to find room to mount the duplexers and other RF equipment and associated electronics on each antenna panel.

FIG. 2 is a perspective view of a conventional duplexer 50. FIG. 3 is a perspective view of the conventional duplexer 50 of FIG. 2 with the cover plate removed therefrom. FIG. 4 is a top perspective view of a portion of the housing of duplexer 50.

Referring to FIGS. 2-4, the conventional duplexer 50 is implemented as a three port resonant cavity filter. The duplexer 50 includes a housing 60 that has a floor 62 and a plurality of sidewalls 64. An interior ledge 66 is formed around the periphery of the housing 60. A plurality of internal walls 68 extend upwardly from the floor 62 to divide the interior of the housing 60 into a plurality of cavities 70. Coupling windows 72 are formed within the walls 68, and these windows 72 as well as openings between the walls 68 allow communication between the cavities 70. A large number of internally-threaded columns 74 are formed in the walls 68. A plurality of resonating elements 76 are mounted within the cavities 70. The resonating elements 76 may comprise, for example, dielectric resonators or coaxial metal resonators, and may be mounted by screws 80 onto selected ones of the internally threaded cavities 74 that are formed in the walls 68. A cover plate 78 acts as a top cover for the duplexer 50. A large number of additional screws 80 are used to tightly hold the cover plate 78 into place so that the cover plate 78 continuously contacts the interior ledge 66 and the top surfaces of the walls 68 to provide good performance with respect to Passive Intermodulation ("PIM") distortion.

An input port 82 may be attached to an output port of a transmit path phase shifter (not shown) via a first cabling connection 83. An output port 84 may be attached to an input port of a receive path phase shifter via a second cabling connection 85. A common port 86 may connect the duplexer 50 to a radiating element of the antenna (not shown) via a third cabling connection (not shown). A plurality of tuning screws 90 are also provided. The tuning screws 90 may be adjusted to tune aspects of the frequency response of the duplexer 50 such as, for example, the center frequency of the notch in the filter response. It should be noted that the device of FIGS. 2-4 comprises two duplexers that share a common housing, which is why the device includes more than three ports (the device includes a total of six ports, although all of the ports are not visible in the views of FIGS. 2-4).

The conventional duplexer 50 of FIGS. 2-4 may provide acceptable performance. However, the duplexer 50 may be relatively large, and hence it may be difficult to make room to mount a large number (e.g., ten) of these duplexers 50 on a single flat panel phased array antenna. The duplexer 50 may also be relatively heavy, which increases the loading on the antenna. The duplexer 50 also has a large number of parts making fabrication and assembly more expensive.

SUMMARY OF THE INVENTION

In view of at least one of the above problems, the present invention provides filter assemblies, tuning elements and a method of tuning a filter.

According to a first aspect of the present invention, a filter assembly is provided. The filter assembly includes a housing having a top cover, a bottom cover and at least one sidewall, the top cover, the bottom cover and the at least one sidewall defining an internal cavity, the housing configured to receive first through third radio frequency ("RF") transmission lines; a top metal sheet mounted within the internal cavity that has a plurality of openings that form a first hole pattern; and a bottom metal sheet mounted within the internal cavity that has a plurality of openings that form a second hole pattern. The top and bottom metal sheets are vertically spaced-apart from each other in a vertically stacked relationship within the internal cavity. The top metal sheet and the bottom metal sheet each include at least one resonator.

According to a second aspect of the present invention, a filter assembly is provided. The filter assembly includes a housing; a top resonator plate mounted within the housing; and a bottom resonator plate mounted within the housing in a stacked relationship with the top resonator plate. The top resonator plate is soldered to the housing via a first continuous solder joint that extends all of the way around an internal periphery of the housing.

According to a third aspect of the present invention, a filter assembly is provided. The filter assembly includes a housing that defines an internal cavity; a first substantially planar metal resonator plate having a first hole pattern formed therein mounted within the internal cavity; and a second substantially planar metal resonator plate having a second hole pattern formed therein mounted within the internal cavity in a stacked relationship with the first substantially planar metal resonator plate. At least the first and second hole patterns, a distance between the first and second substantially planar metal resonator plates, and a size and shape of the internal cavity are configured to achieve a pre-selected filter response.

According to a fourth aspect of the present invention, a filter assembly is provided. The filter assembly includes a housing having a top cover, a bottom cover and a first sidewall, the top cover, the bottom cover and the first sidewall defining an internal cavity; a printed circuit board mounted at least partially within the housing, the printed circuit board including at least first and second conductive layers that each include a plurality of resonating elements that form part of a resonant cavity filter.

According to a fifth aspect of the present invention, a tuning element that is implemented in an opening in a metal plate of a filter is provided. The tuning element includes a coupling element; a first arm having a first end that is connected to the metal plate and a second end that is connected to the coupling element; and a second arm having a first end that is connected to the metal plate and a second end that is connected to the coupling element.

According to a sixth aspect of the present invention, a tuning element is provided. The tuning element includes a coupling element that is disposed in an opening in a wall of a filter housing, the coupling element connected to the wall by respective first and second arms.

According to a seventh aspect of the present invention, a method of tuning a filter is provided. The method includes moving a coupling plate that is disposed in an opening in a wall of the filter in a direction substantially perpendicular to a plane defined by the wall.

The filter assembly as provided in any of the embodiment of the above aspects of the present invention provides small, light, low cost and easily manufactured and assembled filter assembly that can be used as a duplexer, a diplexer, a combiner and/or as other filters for cellular communications systems and other applications.

DETAILED DESCRIPTION

Figure 1:
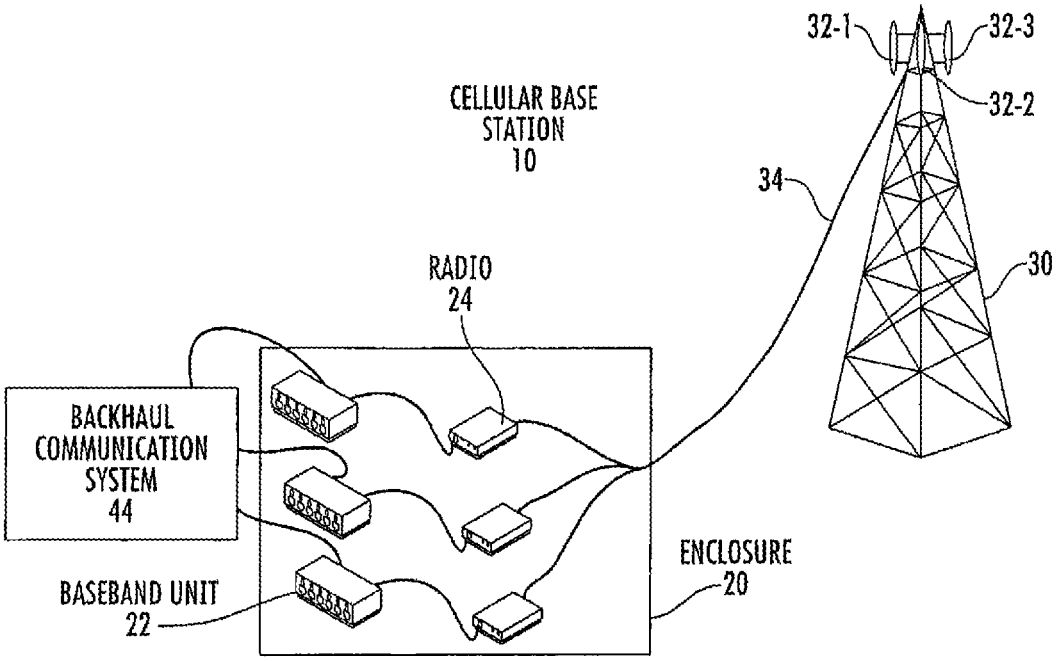
FIG. 1 (PRIOR ART)
FIG. 1 is a highly simplified, schematic diagram of a conventional cellular base station.

Embodiments of the present invention provide small, light, low cost and easily manufactured and assembled filter assemblies that can be used as duplexers, diplexers, combiners and/or as other filters for cellular communications systems and other applications. These filter assemblies can be implemented as a plurality of resonator plates that are mounted within a housing to realize a resonant cavity RF filter. The resonator plates may be mounted in a stacked relationship. In example embodiments, two resonator plates may be provided, which will typically be referred to herein as the "top" resonator plate and the "bottom" resonator plate. However, it will be appreciated that in other embodiments more than two resonator plates may be included in the filter assembly, and that the orientation of the resonator plates may be changed (e.g., the resonator plates may be arranged side-by-side). The resonator plates may be fixed to the housing by continuous solder joints and/or may be die cast integrally with other elements of the housing to provide very high levels of RF and PIM distortion performance.

Each resonator plate may comprise, for example, a substantially flat or "planar" metal plate that has a plurality of resonators formed therein. These resonators may be formed by stamping or otherwise cutting a plurality of holes in each resonator plate in a specific pattern. The resonator plates may include an Organic Solder Preservative ("OSP") as a protective coating for the metal surfaces thereof prior to soldering. Alternative platings can be used to provide a surface that can be soldered and that will provide a connection that is mechanically reliable. Examples of such alternative platings are silver or tin. In other embodiments, the resonator plates may comprise patterned conductive layers on one or more printed circuit boards. The shape and relative locations of the resonators, the distance between the resonator plates, and the size and shape of the filter cavity can be designed to provide a resonant cavity filter having a desired filter (frequency) response. The housing may be implemented, for example, as a frame that has a plurality of sidewalls and a pair of planar metal sheets that act as top and bottom covers that are soldered to the frame. The frame may be manufactured by, for example, die-casting or by using computer numerical control ("CNC") machines. As noted above, silver or tin surface plating may also be provided. The interior of the housing may comprise a single cavity, and the resonator plates may be mounted within this cavity. In some embodiments, a continuous ledge may extend around the interior of the frame, and the top and bottom resonator plates may be soldered to the respective top and bottom surfaces of this ledge. Bendable tuning stubs or twistable tuning elements may be provided in the top cover, the bottom cover and/or on the resonator plates that may be used to tune the response of the filter.

In some embodiments, the filter assemblies may comprise three port devices such as RF duplexers or diplexers. In other embodiments, these filter assemblies may include additional ports to implement multiplexers, triplexers, combiners or the like.

The filter assemblies according to embodiments of the present invention may include, for example, two or more ports that are used to electrically connect the filter assemblies to other external devices. These ports may include "individual" ports, which refer to ports that are only intended to carry signals having frequencies in specific ranges, and "common" ports, which are intended to carry signals having frequencies in multiple of the specific ranges. For example, when a filter assembly according to embodiments of the present invention is a duplexer, the filter assembly will include a first individual port that connects to the transmit path phase shifter, a second individual port that connects to a receive path phase shifter, and a common port that connects to a radiating element such as a radiating element of a phased array antenna. In some embodiments, the individual and common ports may be, for example, implemented as coaxial connector ports that are designed to mate with a connectorized coaxial cable. In other embodiments, the individual and common ports may simply comprise respective openings in the housing that receive unconnectorized cables. In such embodiments, the center conductors of each cable may be connected (e.g., soldered) to one of the resonator plates and the outer conductor of each cable may be connected (e.g., soldered) to the housing. By using such soldered connections, the size and cost of the filter assembly may be further reduced in some embodiments. In still other embodiments, the individual and/or common ports may be implemented as transmission lines on a printed circuit board that extends through an opening in the filter housing. Such embodiments may reduce or eliminate the need for coaxial cables and/or soldered connections to the filter.

The filter assemblies according to embodiments of the present invention may provide high levels of RF performance. Since continuous soldered connections may be used to mount the resonator plates within the cavity and the top and bottom covers to the frame, the filter assembly may have highly consistent metal-to-metal interfaces and hence may exhibit low insertion loss values and very low levels of Passive Intermodulation ("PIM") distortion. The top and bottom covers may be formed of thin sheet metal, and the lack of internally threaded columns (for receiving screws) may greatly decrease the amount of metal required to form the housing. Consequently, both the size and the weight of the filter assemblies may be significantly reduced as compared to prior art filter designs. The filter assemblies are also formed using a very small number of parts, which reduces both the material costs and assembly costs for the filter assembly. In some embodiments, one or both resonator plates may be die cast with the frame to provide a monolithic structure, thereby eliminating soldered connections between the resonator plates and the frame. This may improve the PIM distortion performance of the filter and/or simplify the manufacturing of the filter.

In some embodiments, the filters may include twistable tuning elements that may be cut or stamped into walls of the filter housing (e.g., the top and bottom covers or a sidewall) or into the resonator plates. The twistable tuning elements may include a coupling element and two or more arms that connect the coupling element to the wall or plate. The coupling element may be displaced axially into the filter cavity and may move along an axis that is generally perpendicular to a plane defined by the wall or plate. As such, the tuning element may be designed to remain centered over an underlying element (e.g., a resonator plate) in the filter cavity, regardless of the degree to which the tuning element is moved as part of the tuning process. The tuning element may rotate or "twist" in the plane that is parallel to the wall or plate as it is moved, which facilitates maintaining its position along the axis. As will be discussed herein, these twistable tuning elements may be cheap and easy to manufacture while exhibit performance that may be superior to more complex and expensive conventional tuning elements such as tuning screws and tuning stubs.

Embodiments of the present invention will now be described in greater detail with reference to the attached drawings, in which example embodiments are depicted.

Figure 5:
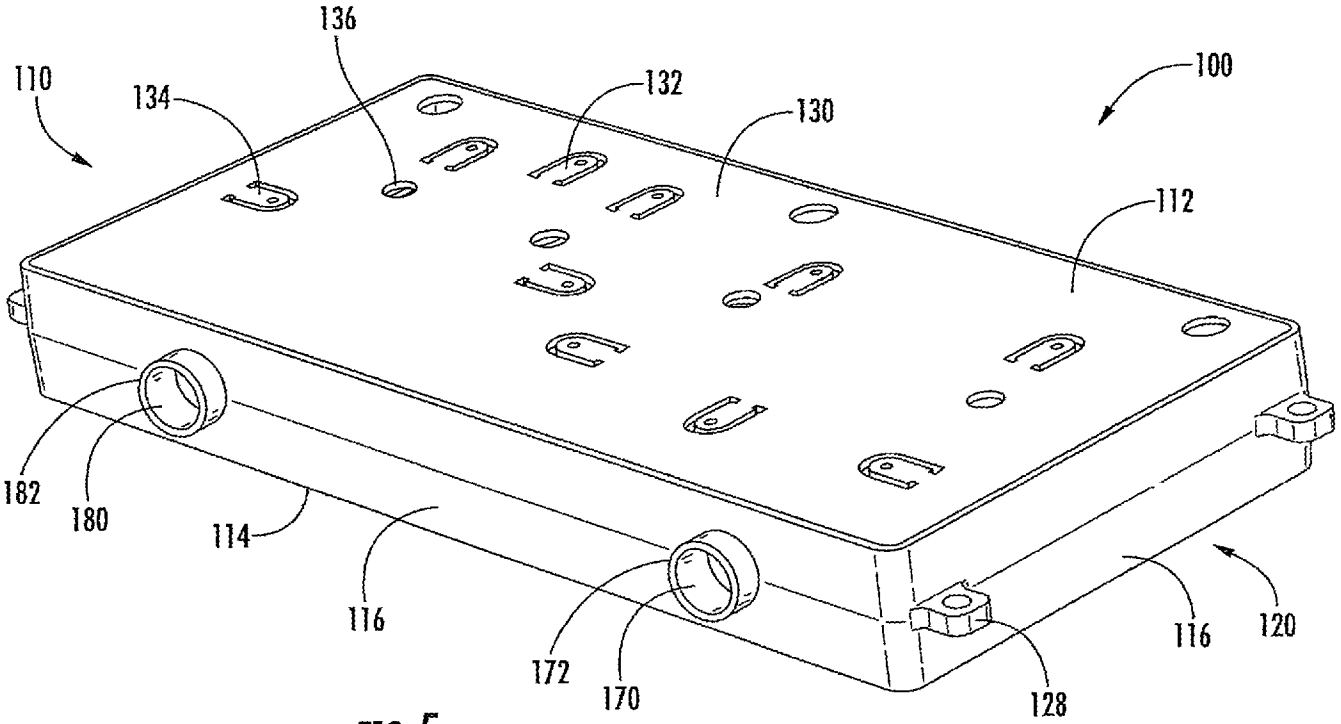
FIG. 5 is a perspective view of a filter assembly according to embodiments of the present invention.
Figure 6:
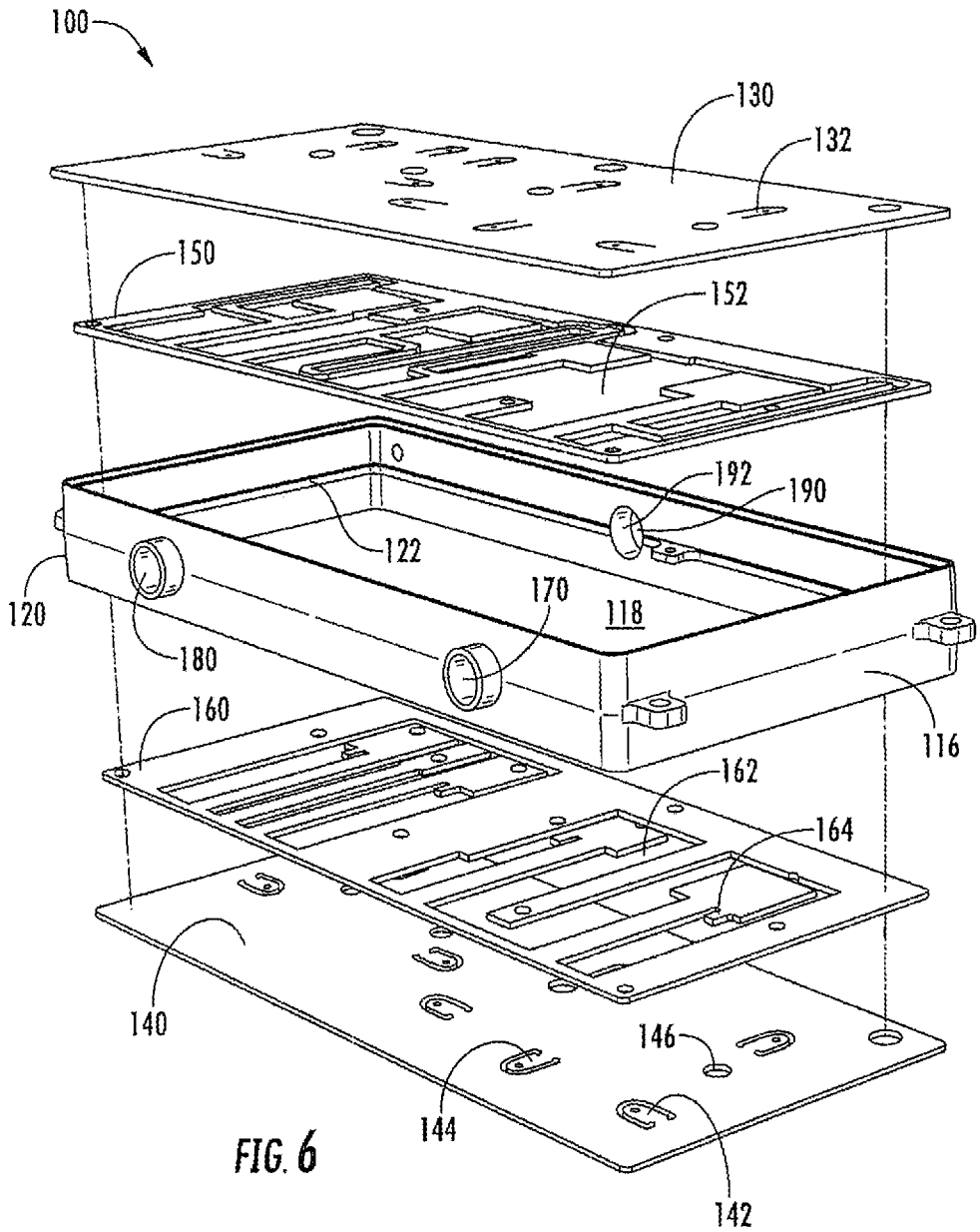
FIG. 6 is an exploded perspective view of the filter assembly of FIG. 5.
Figure 7:
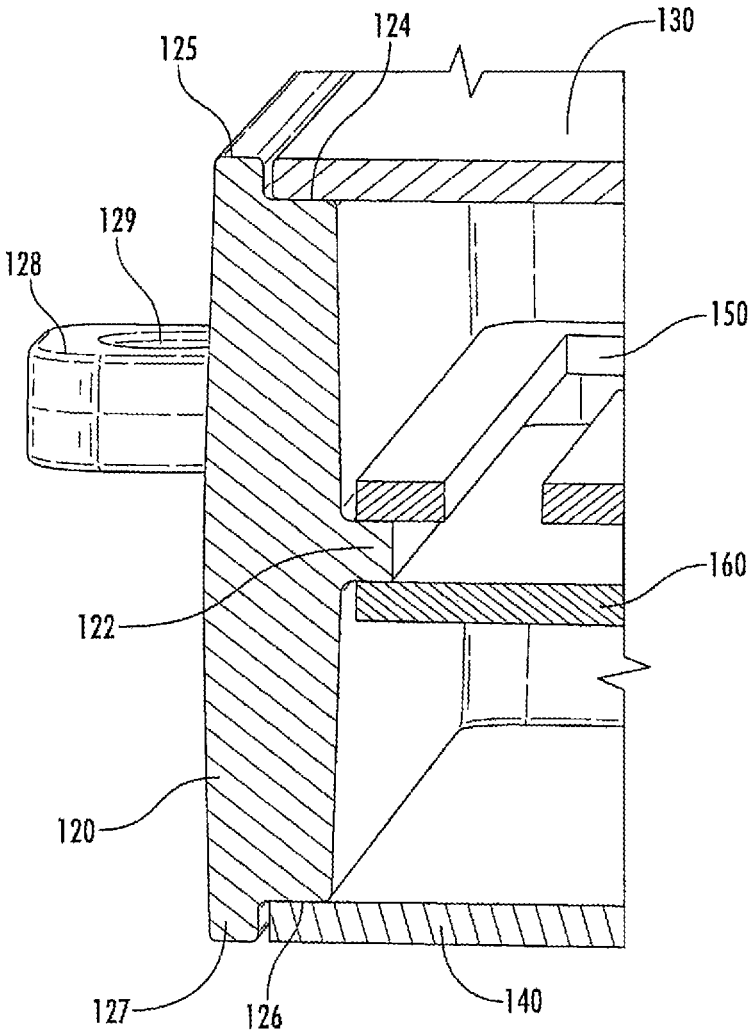
FIG. 7 is a cross-sectional perspective view of a portion of the filter assembly of FIGS. 5-6.

FIGS. 5-7 illustrate a filter assembly 100 according to embodiments of the present invention. In particular, FIG. 5 is a perspective view of the filter assembly 100, FIG. 6 is an exploded perspective view of the filter assembly 100, and FIG. 7 is an enlarged side perspective view of a portion of the filter assembly 100.

As shown in FIGS. 5-7, the filter assembly 100 includes a housing 110 that comprises a frame 120, a top cover 130 and a bottom cover 140. First and second resonator plates 150, 160 are mounted within the housing 110. The filter assembly 100 further includes a pair of individual ports 170, 180 and a common port 190.

The housing 110 may comprise, for example, a rectangular housing 110 that has a top 112, a bottom 114 and four sidewalls 116. The top cover 130 may form the top 112 of the housing 110, the bottom cover 140 may form the bottom 114 of the housing 110, and the frame 120 may form the four sidewalls 116 of the housing 110. The top 112, bottom 114 and sidewalls 116 define a cavity 118 in the interior of the housing 110. The frame 120 may have more or fewer than four sidewalls 116.

The frame 120 may comprise, for example, a unitary piece of metal that forms the four sidewalls 116. A ledge 122 may extend around the interior of the frame. The ledge 122 is a continuous ledge, although in other embodiments the ledge 122 may be discontinuous or may even be omitted altogether. The first and second resonator plates 150, 160 may be mounted on the ledge 122 and the ledge 122 may separate the first and second resonator plates 150, 160 by a predetermined distance so that the filter assembly 100 provides a desired frequency response. In some embodiments, the frame 120 may be formed of aluminium or an aluminium alloy that is plated with copper, although other metals may be used such as, for example, zinc, a zinc alloy, copper, a copper alloy, etc. While the frame 120 is rectangular in the depicted embodiment, it will be appreciated that other shaped frames may be used (e.g., circular, pentagonal, etc.).

In some embodiments, the frame 120 may be a die-cast frame. In other embodiments, the frame 120 may be a stamped piece of metal that is formed into a rectangle and the ends soldered together. In such embodiments, the ledge 122 may be one or more separate pieces of metal that are soldered or otherwise secured to the interior of the frame 120. As shown best in FIG. 7, the interior of the upper surface of the frame 120 includes a recess 124 so that a lip 125 extends upwardly along the outer portion of the upper surface of the frame 120. Outer edges of the top cover 130 may rest on the bottom surface of the recess 124 which provides a convenient surface for soldering the top cover 130 to the frame 120. Likewise, the interior of the lower surface of the frame 120 includes a recess 126 so that a lip 127 extends downwardly along the outer portion of the lower surface of the frame 120. Outer edges of the bottom cover 140 may rest on the bottom surface of the recess 126 which provides a convenient surface for soldering the bottom cover 140 to the frame 120. A plurality of flanges 128 may extend from the outer surface of the frame 120. Each flange 128 may have an aperture 129 therethrough. Screws (not shown) may be inserted through the apertures to mount the filter assembly 100 to an underlying surface such as, for example, the back side of a flat panel antenna.

The top cover 130 and the bottom cover 140 may each comprise metal plates. In some embodiments, the top and bottom covers 130, 140 may be formed of copper-plated aluminium, although other materials may be used including, for example, any of the exemplary metals listed above that may be used in some embodiments to form the frame 120. The top and bottom covers 130, 140 may include an OSP as a protective coating for these metal surfaces prior to soldering. Alternative platings can be used to provide a surface that can be soldered and that will provide a connection that is mechanically reliable. Examples of such alternative platings are silver or tin. The top cover 130 may be placed on the frame so that the outer perimeter of the bottom surface thereof rests in the recess 124. The top cover 130 may be soldered to the frame 122 by a continuous solder joint that extends around the outer perimeter of the bottom surface of the top cover 130.

A plurality of tuning stubs 132 may be formed in the top cover 130. Each tuning stub 132 may be formed by, for example, making a U-shaped cut in the top cover 130 to form a cantilevered tab 134. The cantilevered tabs 134 may be bent inwardly to tune the filter assembly 100. Such tuning of the filter assembly 100 may be performed during the last phase of manufacture to fine-tune the filter response. A plurality of openings 136 may also be provided in the top cover 130 that may provide access to, for example, additional tuning stubs that may be formed on one or more of the resonator plates 150, 160, as will be discussed below.

The bottom cover 140 may be similar to the top cover 130, and may include a plurality of tuning stubs 142 in the form of cantilevered tabs 144. The cantilevered tabs 144 may be bent inwardly to tune the filter assembly 100. A plurality of openings 146 may also be provided in the bottom cover 140 that may provide access to, for example, tuning stubs that are formed on one or more of the resonator plates 150, 160. The bottom cover 140 may be placed on the frame 120 so that the outer perimeter of the top surface thereof rests in the recess 126. The bottom cover 140 may be soldered to the frame 120 by a continuous solder joint that extends around the outer perimeter of the top surface of the bottom cover 140.

While the housing 110 of the filter assembly 100 is formed of a frame 120, a top cover 130 and a bottom cover 140, it will be appreciated that other housing designs may be used in other embodiments that may be shaped differently, formed differently and/or have more or fewer parts. As one simple example, in another embodiment, the bottom cover 140 and the frame 120 could comprise a single die-cast unit, and the ledge 122 could be non-continuous so as to allow the bottom resonator plate 160 to be inserted below the ledge 122 from above (this would also necessitate changes to the bottom resonator plate) and soldered to the underside of ledge 122. Numerous other changes to the housing 110 could be made. Thus, it will be appreciated that housing 110 is shown so that this disclosure will be thorough and complete, but is not intended to limit the scope of the present invention.

The resonator plates 150, 160 may each comprise, for example, substantially planar metal plates. The resonator plates 150, 160 may only be "substantially" planar as they may include, for example, non-planar features such as tuning stubs that may be bent upwardly or downwardly to tune the response of the filter assembly 100. Each resonator plate 150, 160 may be formed of, for example, copper or a copper alloy, although other metals may be used. Each resonator plate 150, 160 comprises one or more resonating elements. Openings 152, 162 are punched or otherwise formed in the respective resonator plates 150, 160 to create a "hole pattern" in each resonator plate 150, 160. The size and location of these openings 152, 162, along with the distance between the two resonator plates 150, 160, the location of the resonator plates 150, 160 within the cavity 118 and the size and shape of the cavity 118 determine, at least in part, the frequency response of the filter assembly 100. The resonator plates 150, 160 may be in a closely-spaced relationship so that they strongly couple with each other, which may provide a transmission zero (i.e., nulls in the frequency response) that is used to provide a steep filter response. Such responses are desirable to achieve high RF performance.

Figure 8:
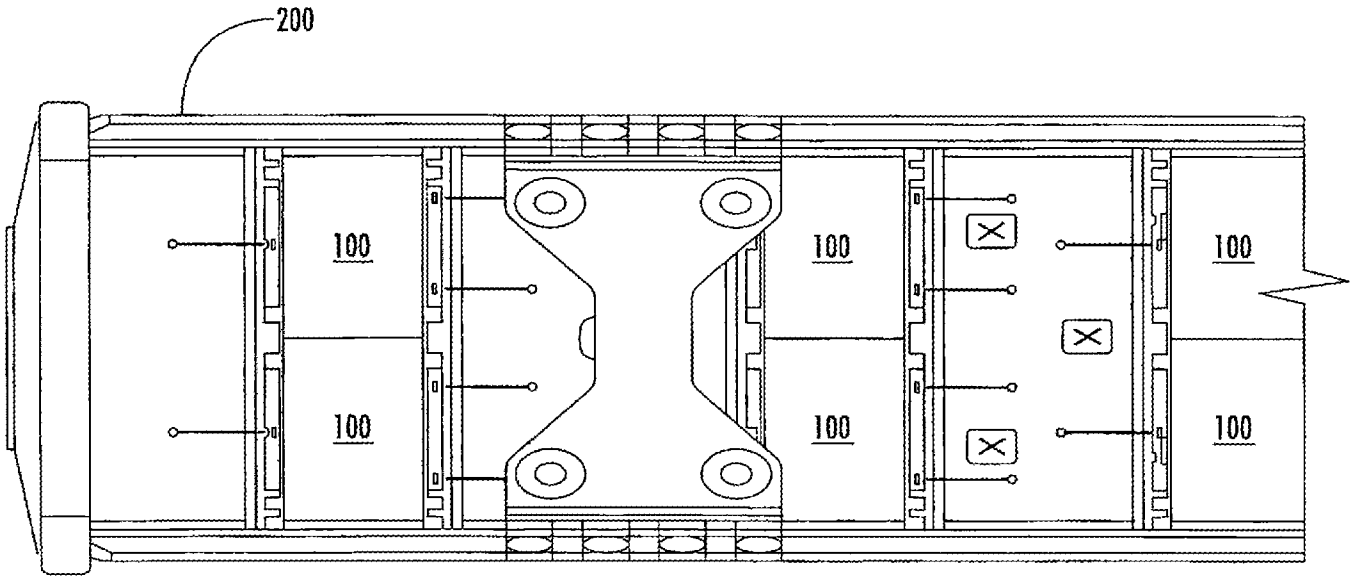
FIG. 8 is back side view of an antenna panel that includes six of the filter assemblies of FIGS. 5-7.
Figure 9:
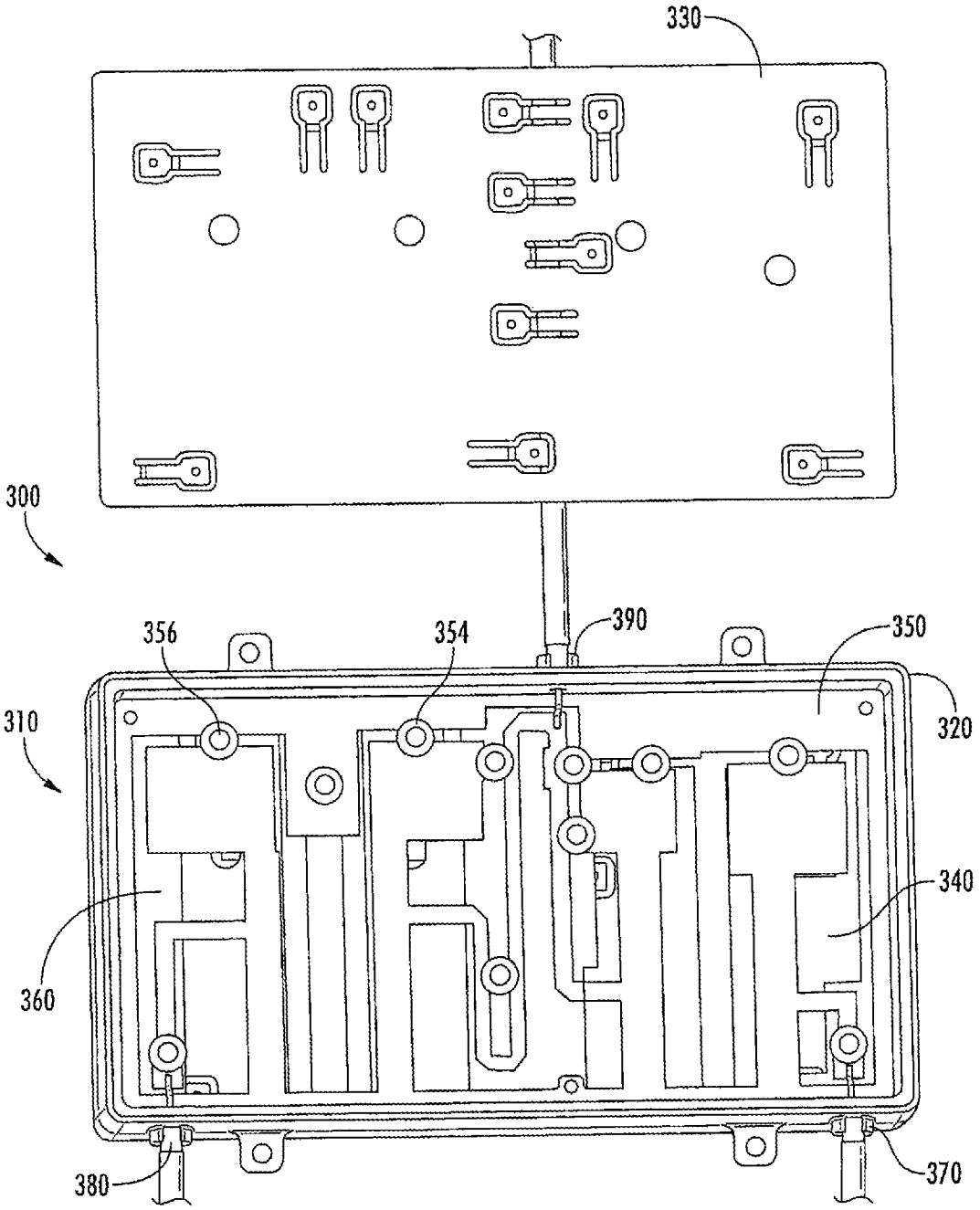
FIG. 9 is a top view of a filter assembly according to further embodiments of the present invention with the top cover removed.

Dielectric spacers (not shown in FIGS. 5-7, but similar spacers are shown in the embodiment of FIGS. 8-9 discussed below) may be provided that are positioned between the resonator plates 150, 160 to ensure that a desired separation distance may be maintained between the resonator plates 150, 160. Such spacers may also be provided between resonator plate 150 and the top cover 130 and/or between resonator plate 160 and the bottom cover 140. Tuning stubs may also be included on one or both of the resonator plates 150, 160. In the depicted embodiment, tuning stubs 164 are included on the bottom resonator plate 160.

As shown best in FIGS. 6 and 7, resonator plate 150 may rest on the upper surface of ledge 122, and resonator plate 160 may rest on the lower surface of ledge 122. In some embodiments, each resonator plate 150, 160 may be soldered to the ledge 122.

As shown best in FIG. 5, the filter assembly 100 further includes a pair of individual ports 170, 180 and a common port 190. In the depicted embodiment, each of the ports 170, 180, 190 may be implemented as an opening in a sidewall 116 of the housing that is configured to receive a coaxial cable. Each port 170, 180, 190 may include one or more respective outwardly protruding flanges 172, 182, 192. Each of these flanges 172, 182, 192 may define a portion of a circle (or a full circle) and an inner radius defined by the flange(s) 172, 182, 192 for each port 170, 180, 190 may be sized to mate with the outer conductors of coaxial cables that are inserted into the respective ports 170, 180, 190. Each of these coaxial cables may be prepared for termination into the filter assembly 100 by removing a portion of the dielectric layer and the outer conductor of the cable so that the center conductor protrudes from the end of the cable. The jacketing material may also be removed from the end of each cable to expose the center conductor and an end portion of the outer conductor. The coaxial cables may be inserted into their respective ports 170, 180, 190 so that the center conductor of each cable extends into the cavity 118. The center conductor of each cable may be physically and electrically connected to one of the resonator plates 150, 160 by, for example, soldering. In some embodiments, the center conductors of the coaxial cables may all be connected to the same resonator plate 150, 160, but embodiments of the present invention are not limited thereto. The outer conductors of the coaxial cables may be physically and electrically connected to the housing 110 by, for example, soldering the outer conductors to the respective flanges 172, 182, 192 of the respective ports 170, 180, 190.

In some embodiments, a first type of solder may be used to solder the resonator plates 150, 160 to the frame 120 and a second type of solder may be used to solder the top and bottom covers 130, 140 to the frame 120. For example, a high temperature tin-silver-copper solder paste may be printed along the edge (i.e., the outer perimeter) of the lower surface of the top resonator plate 150 and the top resonator plate 150 may be placed on the upper surface of ledge 122 of frame 120. The high temperature tin-silver-copper solder paste may also be printed along the edge of the upper surface of the bottom resonator plate 160 and the bottom resonator plate 160 may be placed on the underside of ledge 122 of frame 120. As discussed above, dielectric spacers may also be provided between the resonator plates 150, 160. These spacers may be formed of a material that can withstand the temperatures used to reflow the solder paste. The resonator plates 150, 160 may be held in position using appropriate fixtures, and the frame 120, resonator plates 150, 160 and any dielectric spacers may then be heated in, for example, a convection oven, to a temperature that is sufficient to reflow the solder paste to form a continuous solder joint between each resonator plate 150, 160 and the ledge 122. It should be noted that the solder paste may additionally or alternatively be printed or otherwise applied to the ledge 122. It will also be appreciated that alternative solder materials can also be used in lieu of solder paste, such as one or more solder preform(s).

A second soldering process may be used to attach the top and bottom covers 130, 140 to the frame 120 and to solder the coaxial cables to the filter assembly 100. A lower temperature solder may be used in this subsequent process so that the solder used to attach the resonator plates 150, 160 to the frame 120 does not reflow during the processing step used to solder the coaxial cables in place and to solder the covers 130, 140 to the frame 120. In some embodiments, a bismuth-tin-silver solder paste may be used in the second soldering operation. The center conductors and outer conductors of the coaxial cables may be coated with the solder paste and inserted through the respective ports 170, 180, 190 so that the solder on the outer conductors engages the respective flanges 172, 182, 192 and the center conductors (with solder thereon) are attached to the appropriate resonator plates 150, 160. Alternative solder materials can also be used in lieu of solder paste, such as one or more solder preform(s). In some embodiments, solder paste may be used to solder the resonator plates 150, 160 and the top and bottom covers 130, 140 to the frame 120, while solder performs are used to solder the cables to the respective ports 170, 180, 190 and/or flanges 172, 182, 192. Alternate soldering processes such as induction soldering or manual soldering with a soldering iron can be used to solder the cables to the filter assembly 100.

The bismuth-tin-silver solder paste may then be stencil printed either onto the edge of the bottom surface of the top cover 130 and the edge of the top surface of the bottom cover 140 or, alternatively (or additionally) onto the respective top and bottom surfaces of the recesses 124, 126, and the top and bottom covers 130, 140 may then be attached to the frame 120, using additional fixtures if necessary and/or alternate preform solder material. The filter assembly 100 may then be placed in the convection oven a second time and heated to a temperature that is sufficient to reflow the bismuth-tin-silver solder paste but that is lower than the melting temperature of the tin-silver-copper solder paste.

The filter assembly 100 may implement a filter that is conventional from an equivalent circuit viewpoint in that it will have resonators and cross-couplings that are conventional in nature and which provide a conventional frequency response. However, the mechanical design of the filter assembly 100 may be much simpler than conventional filter assemblies so that the filter assembly 100 has far fewer parts, a smaller physical footprint, is lighter weight than conventional filter assemblies and far easier to manufacture and assemble.

In some embodiments, the filter assembly 100 may be a duplexer that is used on phased array antennas having remote electronic tilt functionality. The phased array antenna may have, for example, ten radiating elements, five of which are used to transmit and receive signals having a first polarization and the other five of which are used to transmit and receive signals having a second, orthogonal polarization. In order to implement the remote electronic tilt, a total of four phase shifters are provided that are typically mounted within the antenna (e.g., on the back side of the planar array). In particular, one or more "transmit path" phase shifters are provided that are used to adjust the phase of the signals in the transmit frequency band and one or more "receive path" phase shifters are provided that are used to adjust the phase of the signals in the receive frequency band. A duplexer is provided at the input of each radiating element that is used to connect the transmit and receive transmission paths to the radiating element. Since the phase shifters are mounted on the antenna, each duplexer is also typically mounted on the antenna. Thus, the antenna must have room for a large number of duplexers (ten in the above example), which is why the size and weight of the duplexers may be an important consideration.

While the filter assembly 100 includes two resonator plates 150, 160, it will be appreciated that one or more additional resonator plates may be included in other embodiments. The use of additional resonator plates will generally provide a capability for fine-tuning the frequency response to be closer to an ideal frequency response, but the addition of extra resonator plates may involve the trade-off of a filter assembly having increased cost and/or complexity, and may also increase the insertion loss of the filter assembly.

FIG. 8 is back side view of a portion of an antenna panel 200 that includes five cross-polarized radiating elements and ten of the duplexers of FIGS. 5-7, six of which are visible in the portion of the antenna 200 illustrated in FIG. 8. As shown in FIG. 8, the duplexers 100 are small enough that two duplexers 100 may be mounted side-by-side within the width (which is typically 300 millimeters) of the antenna panel 200. The individual ports 170 of five of the duplexers 100 may be connected to one of the five outputs of the transmit path phase shifter for the first polarization by respective coaxial cables. Likewise, the individual ports 180 of these five duplexers 100 may be connected to one of the five outputs of the receive path phase shifter for the first polarization by additional respective coaxial cables. The common port 190 of the five above-described duplexers 100 may be connected to printed circuit boards associated with each radiating element having the first polarization by additional coaxial cables. The remaining five duplexers may be connected in the same manner to the transmit and receive path duplexers and radiating elements having the second, orthogonal polarization.

Figure 10:
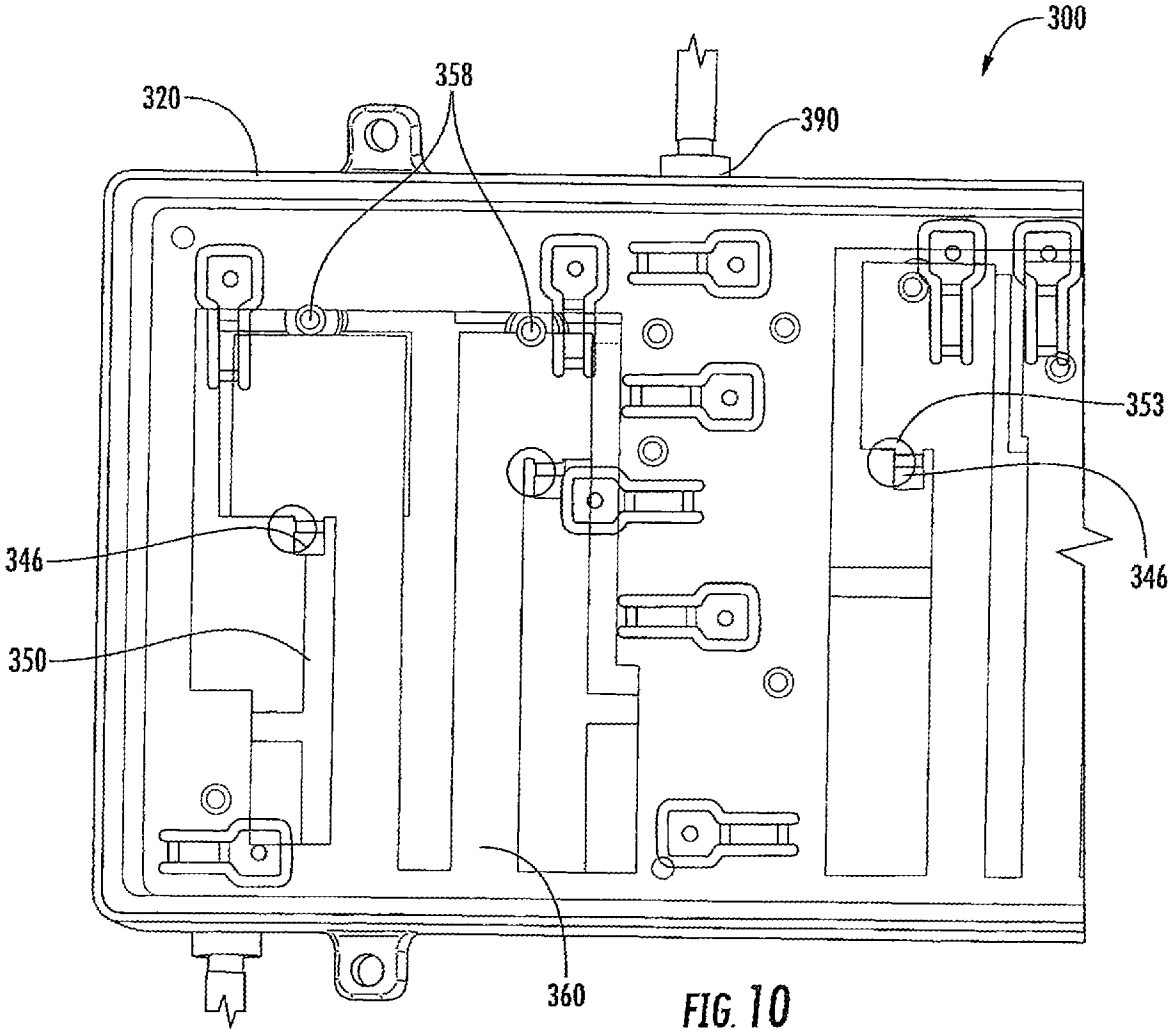
FIG. 10 is a bottom view of a portion of the filter assembly of FIG. 9 with the bottom cover made transparent.

FIGS. 9 and 10 illustrate a filter assembly 300 according to further embodiments of the present invention. In particular, FIG. 9 is a top view of the filter assembly 300 with the top cover thereof removed and set to one side, and FIG. 10 is a bottom view of a portion of the filter assembly 200 with the bottom cover made transparent.

The filter assembly 300 is very similar to the filter assembly 100 described above, and hence only a brief description of filter assembly 300 will be provided here. The description of filter assembly 300 will focus on various features such as the dielectric spacers and tuning stubs on the resonator plates that are described above but not necessarily shown clearly in the drawings.

Referring to FIGS. 9-10, the filter assembly 300 includes a housing 310 that comprises a frame 320, a top cover 330 and a bottom cover 340. Top and bottom resonator plates 350, 360 are mounted within the housing 310. The filter assembly 300 further includes ports 370, 380, 390.

As shown in FIGS. 9 and 10, a plurality of dielectric spacers 354 are provided that are used to help maintain the separation between resonator plates 350, 360 at a desired distance. Each dielectric spacer 354 is shaped like a bolt that has a head 356 and a distal end. A radially-extending flange 358 is provided at the distal end of each dielectric spacer 354. The dielectric spacers 354 are inserted through holes or other openings in the top resonator plate 350 toward the bottom resonator plate 360. The distal end of each dielectric spacer 354 is inserted through holes or other openings in the bottom resonator plate 360. The flange 358 is bent when each dielectric spacer 354 is inserted through the openings in resonator plate 360. In this fashion, the spacers 354 may maintain the resonator plates 350, 360 at a consistent separation distance.

As shown in FIG. 10, a plurality of tuning stubs 353 are included on the top resonator plate 350. These tuning stubs are accessible through the holes 346 in the bottom cover 340. As the design and operation of filter assembly 300 is otherwise very similar to the design and operation of filter assembly 100, which is discussed in detail above, further description of filter assembly 300 will be omitted.

Conventional filter design techniques may be used to design resonating elements in the resonator plates of the above-described filter assemblies and the separation between the resonator plates given a cavity having a selected size and dimensions. As is known to those of skill in the art, high performance RF filters/duplexers require high isolation close to the passband(s) (i.e., the frequency range where signals should be allowed to pass with respect to at least one port of the device). This high degree of isolation is usually realized by cross coupling or by additional resonant elements that provide transmission zeros (i.e., steep nulls in the frequency response) at locations close to the passband. Each cross coupling may require coupling to a non-adjacent resonator and thus a specific resonator arrangement and/or additional coupling elements may be required. Conventionally, at least three resonators are used to generate a transmission zero (null). However, in filter assemblies according to embodiments of the present invention, mixed magnetic and electric coupling techniques are used to realize transmission zeros above/below passband using only two resonators. More detailed description of these techniques can be found in, for example, H. Wang and Q. Chu, An Inline Coaxial Quasi-Elliptic Filter With Controllable Mixed Electric and Magnetic Coupling, IEEE Transactions on Microwave Theory and Techniques, Vo. 57, No. 3, March 2009 at 667-673 and Q. Chu and H. Wang, A Compact Open-Loop Filter With Mixed Electric and Magnetic Coupling, IEEE Transactions on Microwave Theory and Techniques, Vo. 56, No. 2, February 2008 at 431-439, each of which are incorporated herein by reference. By using a filter design that includes two stacked metal resonator plates it may be possible to control the magnetic and electric coupling without an additional element and/or without very narrow gaps, which may be important for tolerances.

Figure 11:
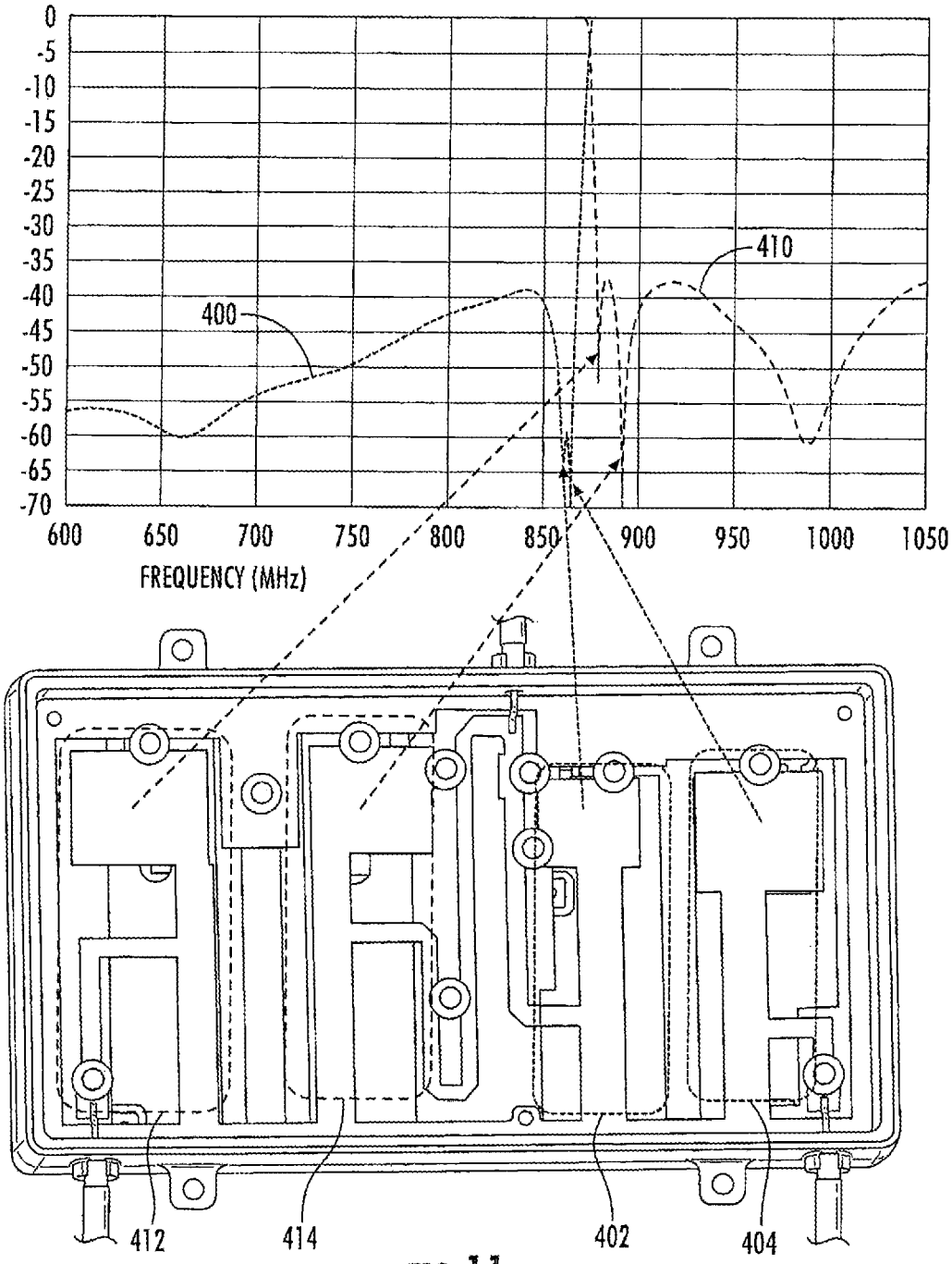
FIG. 11 is a graph that shows the filter response of the filter assembly of FIGS. 9-10.

Simulation software such as Microwave Office and/or CST may be used to design the parameters of the filter given a desired frequency response. The simulation software will specify, for example, the number of resonators required and their relative relationships, which may then be implemented according to the techniques disclosed herein to provide the filter assemblies according to embodiments of the present invention. FIG. 11 is a graph that shows the filter response of the filter assembly 300 of FIGS. 9-10. The view of the filter assembly 300 of FIG. 9 is also included in FIG. 11. In FIG. 11, curve 400 shows the attenuation that occurs, as a function of frequency, on an RF signal passing between the common port and the first individual port, and curve 410 shows the attenuation that occurs, as a function of frequency, on an RF signal passing between the common port and the second individual port. As shown by the arrows in FIG. 11, the portions of resonator plates 350, 360 which are within the boxes 402, 404 generate the nulls in curve 400, and the portions of resonator plates 350, 360 which are within the boxes 412, 414 generate the nulls in curve 410. As can be seen in FIG. 11, steep nulls are generated very close to the respective passbands.

The filter assemblies according to embodiments of the present invention may provide a number of advantages over conventional filter assemblies. As discussed above, most or even all of the components of the filter assemblies according to embodiments of the present invention including the top and bottom covers, the resonator plates and the coaxial cables that are attached to the individual and common ports may be soldered together using continuous solder joints to provide highly consistent metal-to-metal connections. As is known in the art, PIM distortion may occur when two or more RF signals encounter non-linear electrical junctions or materials along an RF transmission path. Such non-linearities may act like a mixer causing new RF signals to be generated at mathematical combinations of the original RF signals. If the newly generated RF signals fall within the bandwidth of existing RF signals, the noise level experienced by those existing RF signals is effectively increased. When the noise level is increased, it may be necessary reduce the data rate and/or the quality of service. PIM distortion can be an important interconnection quality characteristic for an RF communications system, as PIM distortion generated by a single low quality interconnection may degrade the electrical performance of the entire RF communications system. Thus, ensuring that components used in RF communications systems will generate acceptably low levels of PIM distortion may be desirable.

Figure 2:
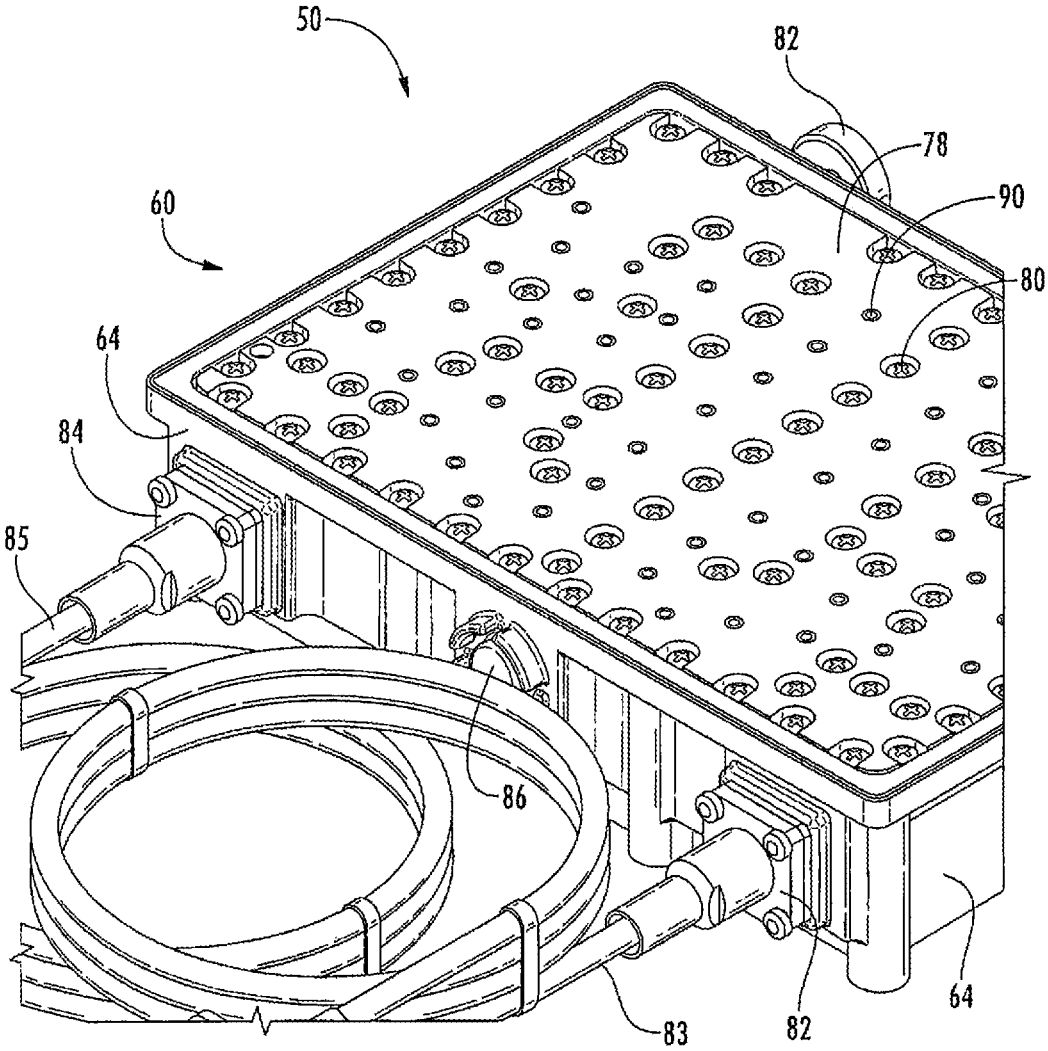
FIG. 2 (PRIOR ART)
FIG. 2 is a perspective view of a conventional duplexer.
Figure 3:
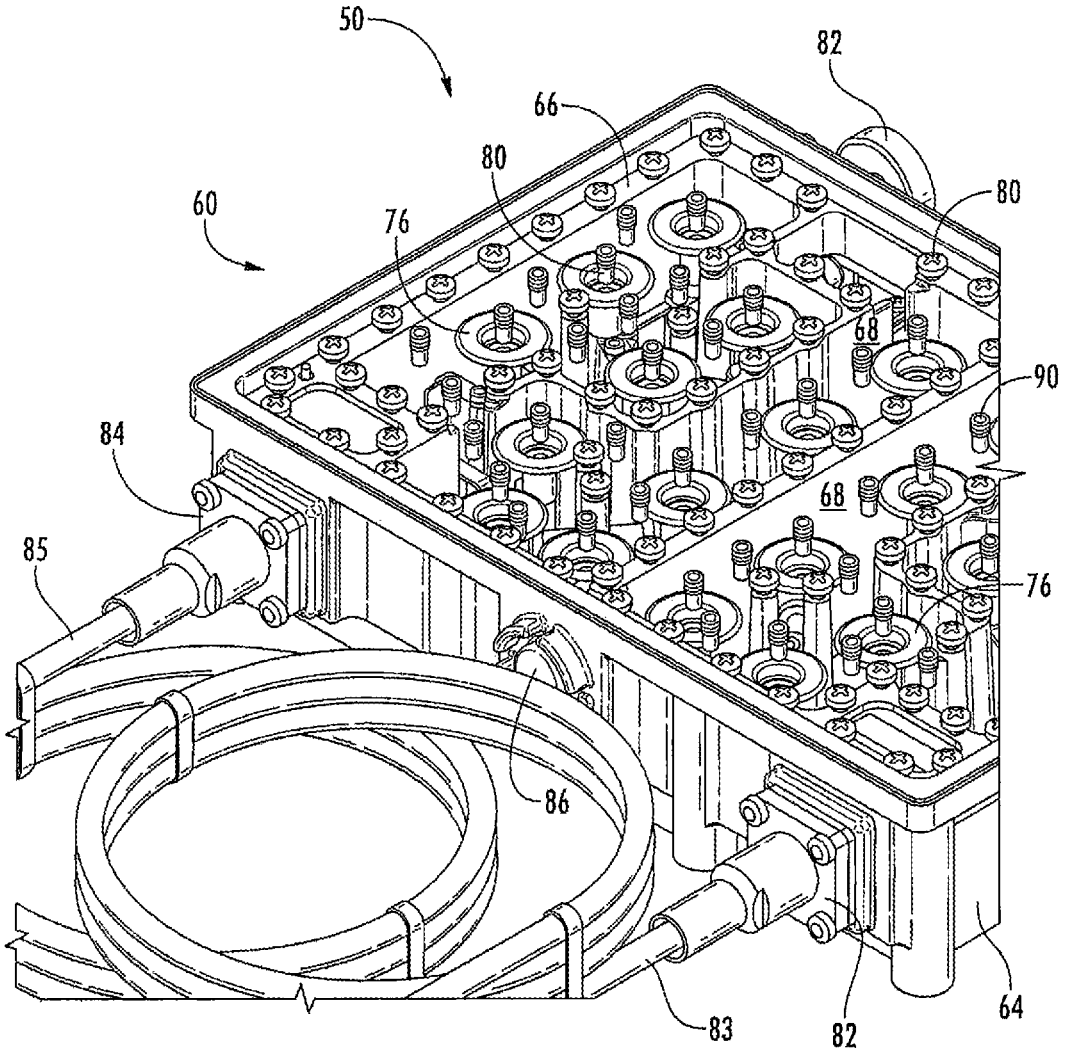
FIG. 3 (PRIOR ART)
FIG. 3 is a perspective view of the conventional duplexer of FIG. 2 with the cover plate removed therefrom.
Figure 4:
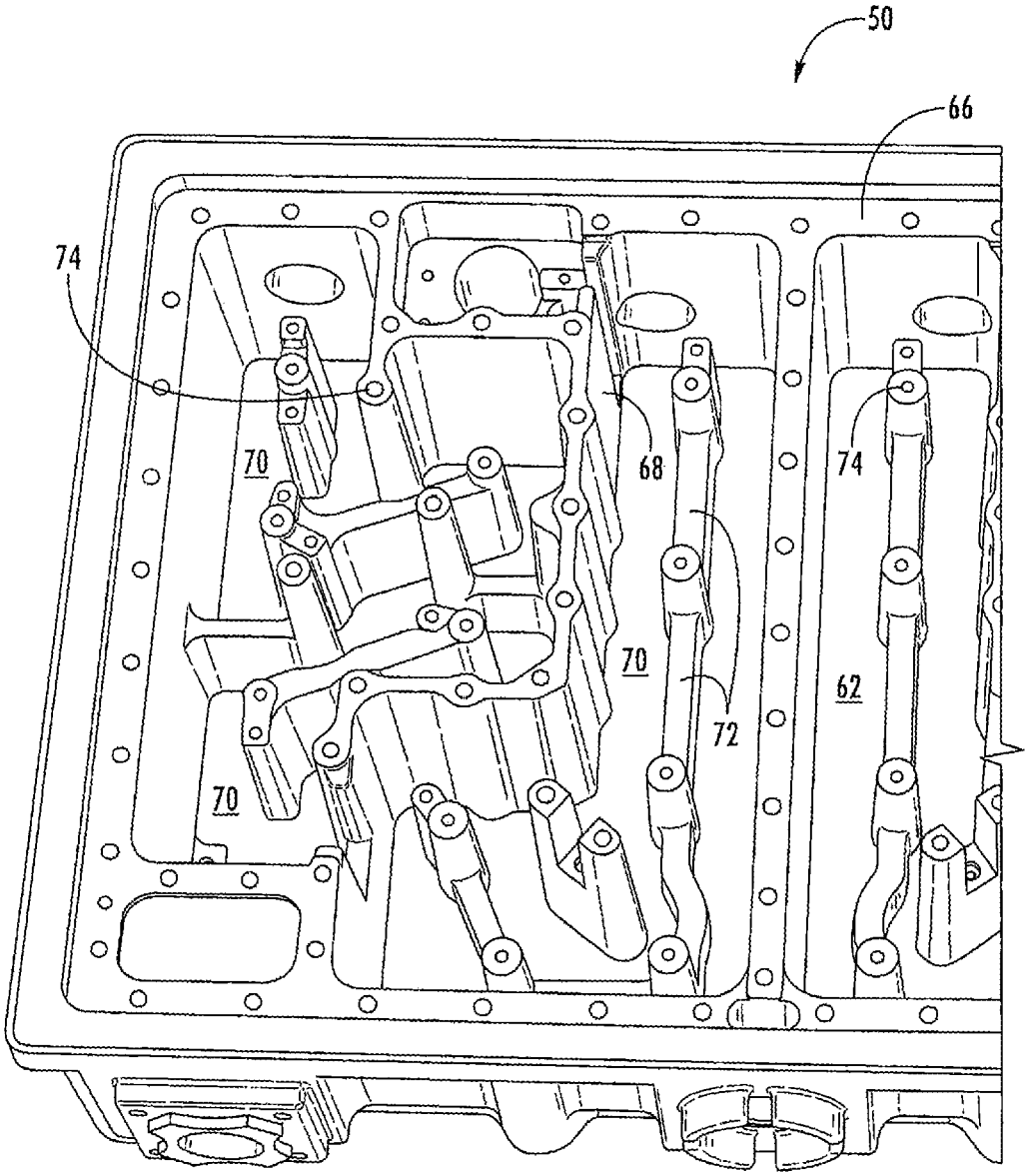
FIG. 4 (PRIOR ART)
FIG. 4 is a top perspective view of a portion of the housing of the conventional duplexer of FIGS. 2-3 with the top cover and resonating elements removed.

As noted above, one possible source of PIM distortion is an inconsistent metal-to-metal contact along an RF transmission path. Referring again to FIGS. 2-4, it can be seen that the conventional filter assembly 50 includes a very large number of screws 80. Such a large number of screws 80 are used to ensure that relatively consistent metal-to-metal contacts are maintained to ensure acceptably low levels of PIM distortion. The filter assemblies according to some embodiments of the present invention may remove all of these screws, which may greatly simplify the filter assembly structure and greatly reduce the time required to assemble the filter. Moreover, the continuously soldered connections may generally provide improved PIM distortion performance as compared to the filter assembly of FIGS. 2-4 that is assembled using screws.

Additionally, if screws are used to assemble a filter assembly, when the screws are tightened, small metal shavings may be torn away from outer surfaces of the screws and/or from inner surfaces of the internally-threaded holes that receive the screws. Such metal shavings are another well-known source of PIM distortion in RF components, and may be particularly troubling as the metal shavings can move around inside the filter assembly resulting not only in increased PIM distortion, but PIM distortion levels that can change over time in unpredictable ways. If increased PIM distortion levels are identified during a PIM distortion test during qualification of a particular unit, then the filter assembly in question can be opened and cleaned to remove the metal particles. However, if the metal particles are not initially detected it can be a significant problem, as PIM distortion may arise later after the filter assembly has been installed, for example, on an antenna that is mounted on a cell tower, requiring a very expensive replacement operation, downtime of the cellular base station, etc. It should be noted that the use of bendable tuning stubs in place of tuning screws may avoid generation of metal shavings within the filter assembly that could otherwise result from adjustment of tuning screws.

It should also be noted that in addition to PIM distortion, inconsistent metal-to-metal connections may give rise to reflections in an RF communications system, which increase the return loss along the RF transmission path. Devices that have such inconsistent metal-to-metal connections may therefore exhibit increased insertion loss values. By using continuously soldered connections, the filter assemblies according to embodiments of the present invention may exhibit improved insertion loss performance.

The filter assemblies according to embodiments of the present invention may also be smaller and lighter weight as compared to conventional filters used in cellular communications systems. This may be important since the filter assemblies may be mounted, for example, on planar antenna arrays where there is limited room for electronic circuitry and because heavier antenna structures may increase the structural requirements on the antenna mounting structure.

The filter assemblies according to embodiments of the present invention may also be extremely cost effective, as they may require less materials to implement, and as the frame may be the only die-cast component as many if not all of the remaining components of the filters may be formed of stamped metal. Moreover, by reducing or even eliminating the need for screws and by substantially reducing the number of parts required to form each filter assembly the assembly costs (and time required for assembly) may be significantly reduced.

It will be appreciated that the filter assemblies according to embodiments of the present invention may be used to implement a wide variety of different devices including duplexers, diplexers, multiplexers, combiners and the like. It will be appreciated that the filter assemblies according to embodiments of the present invention may also be used in applications other than cellular communications systems.

Figure 12:
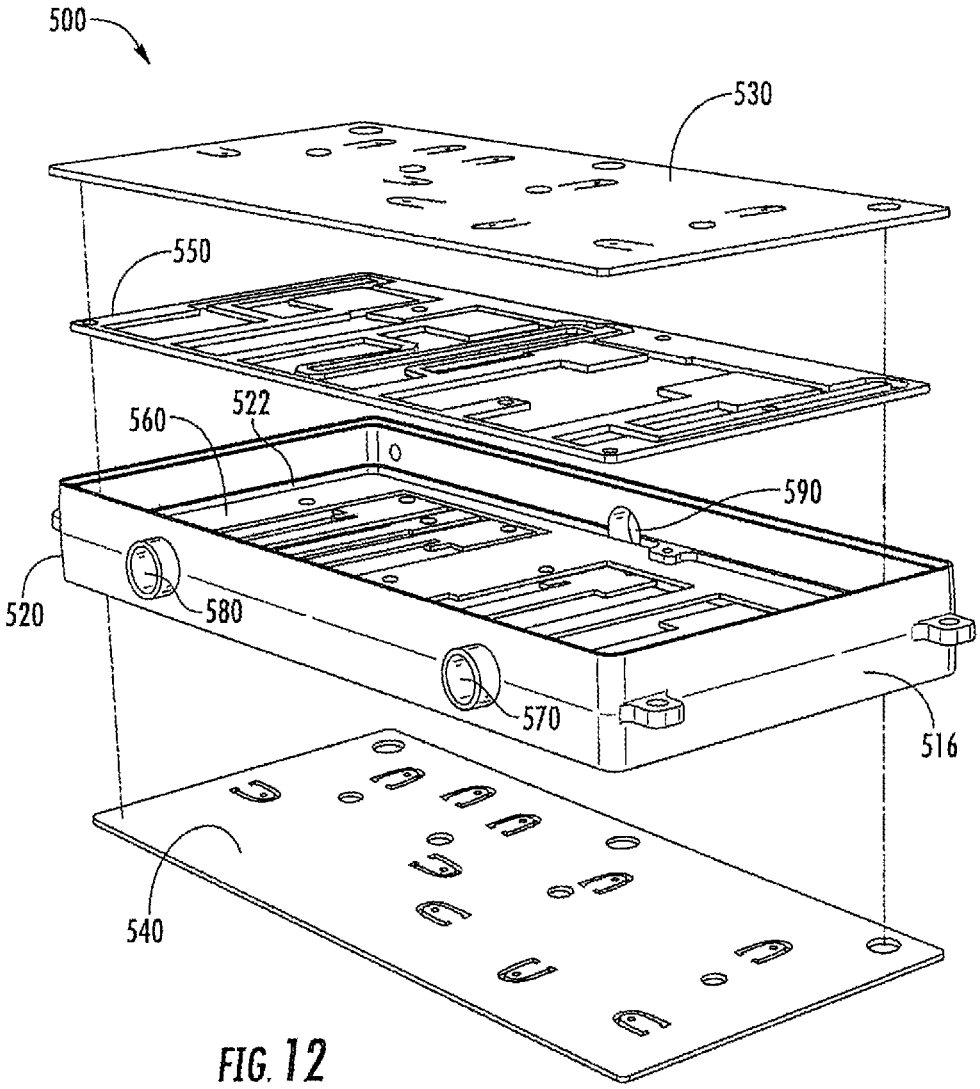
FIG. 12 is an exploded perspective view of a filter assembly according to further embodiments of the present invention.

Pursuant to further embodiments of the present invention, filter assemblies may be provided in which at least one of the resonator plates may be die cast as part of the frame. FIG. 12 is an exploded perspective view of a filter assembly 500 that is an example of such embodiments of the present invention.

As shown in FIG. 12, the filter assembly 500 may be very similar to the filter assembly 100 that is discussed above with reference to FIGS. 5-7. In particular, the filter assembly 500 includes a housing that comprises a frame 520, a top cover 530 and a bottom cover 540. A first resonator plate 550 is mounted within the housing. The filter assembly 500 further includes a pair of individual ports 570, 580 and a common port 590. The top and bottom covers 530, 540 may be identical to the top and bottom covers 130, 140 of the filter assembly 100, and may be attached to the frame 520 in the same manner that the top and bottom covers 130, 140 may be attached to the frame 120 of filter assembly 100. Accordingly, further description of the top and bottom covers 520, 530 will be omitted. Likewise, the individual ports 570, 580 and the common port 590 may be identical to the individual ports 170, 180 and the common port 190 of the filter assembly 100, and hence further description of these ports will also be omitted.

The housing may be identical to the housing 110 of filter assembly 100, and may include a top cover 530, a bottom cover 540 and four sidewalls 516 that are formed by the frame 520. The top cover 530, bottom cover 540 and sidewalls 516 define a cavity in the interior of the housing.

The frame 520 may comprise, for example, a unitary piece of metal and may be similar to the frame 120 of the filter assembly 100. The frame 520 may form the four sidewalls 516 of the housing. A ledge 522 may extend around the interior of the frame 520. The ledge 522 may be continuous or discontinuous, and may be omitted in some embodiments. The frame 520 may also include a second resonator plate 560 that is formed as an integral part of the frame 520. The frame 520 may, for example, be die cast to form the four sidewalls 516, the ledge 522 and the second resonator plate 560 as a single, monolithic structure.

The second resonator plate 560 may contact the ledge 522 and/or may be spaced apart from the ledge 522. Thus, while the depicted embodiment illustrates the ledge 522 directly contacting and extending upwardly from the second resonator plate 560, it will be appreciated that embodiments of the present invention are not limited thereto. The first resonator plate 550 may be mounted on the ledge 522. The first and second resonator plates 550, 560 may be separated by a predetermined distance so that the filter assembly 500 provides a desired frequency response.

The frame 520 may be formed of a suitable material such as, for example, aluminium or an aluminium alloy that is plated with copper. While the frame 520 is rectangular in the depicted embodiment, it will be appreciated that other shaped frames may be used. In some embodiments, the ledge 522 may be soldered to the sidewalls 516 or the second resonator plate 560 instead of being formed in a die casting operation along with the sidewalls 516 and second resonator plate 560. The frame 520 may also include recesses 524, 526 and lips 525, 527 that are identical to the respective recesses 124, 126 and lips 125, 127 included on the frame 120 of filter assembly 100 that are discussed above with reference to FIG. 7. The frame 520 may further include flanges 528 that are identical to the flanges 128 of frame 120 that may be used to mount the filter assembly 500 to a mounting surface.

While the top cover 530 and bottom cover 540 are both separate from the frame 520 in the embodiment depicted above, it will be appreciated that in another embodiment the bottom cover 540 could also be die cast as part of the frame 520 as opposed to being a separate unit.

The first resonator plate 550 may be substantially identical to the resonator plate 150 described above. The second resonator plate 560 may likewise be substantially identical to the second resonator plate 160 described above, except that the second resonator plate 560 may be formed integrally with the frame 520 as a single die cast monolithic unit. As such, further description of the resonator plates 550, 560 will be omitted. It will be appreciated that one or more additional resonator plates may also be included in other embodiments.

Dielectric spacers (not shown in FIG. 12) may be provided that are positioned between the resonator plates 550, 560 in the same manner that dielectric spacers may be positioned between the resonator plates 150, 160, as discussed above. It will also be appreciated that the soldering techniques, materials and the like discussed above with respect to filter assembly 100 are equally applicable to filter assembly 500.

The filter assembly 500 may even be simpler than the filter assembly 100 that is discussed above since it requires at least one less fabrication step, namely soldering the second resonator plate 560 to the frame 520. Moreover, eliminating this soldering step also removes one of the potential sources for PIM distortion, as poor solder connections are a potential source of PIM distortion. The filter assembly 500 may, for example, be a duplexer that is used on a phased array antenna having remote electronic tilt functionality.

While in the filter assembly 500 the second resonator plate 560 and, in some embodiments, the bottom cover 540 are formed integrally with the frame 520, it will be appreciated that in other embodiments the first resonator plate 550 and, if desired, the top cover 530 may instead by formed integrally with the frame 520.

Figure 13:
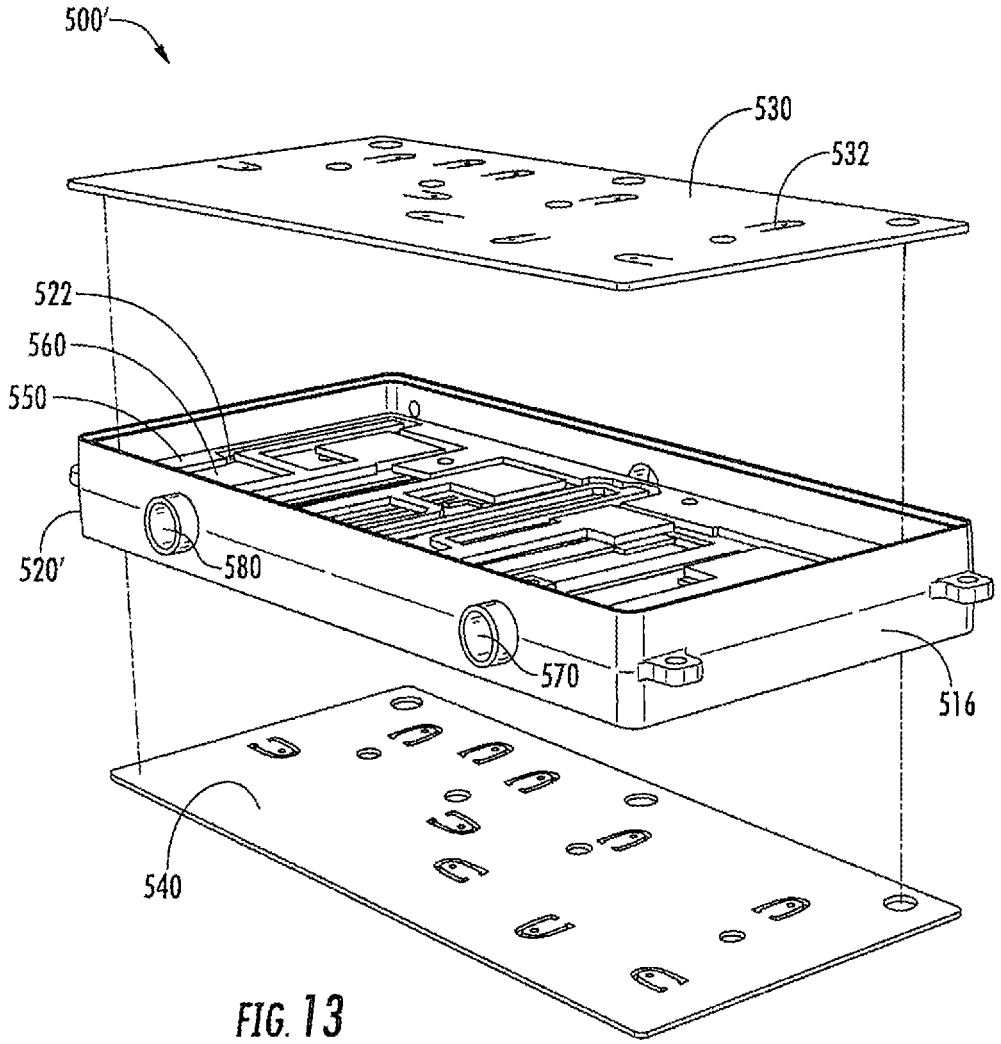
FIG. 13 is an exploded perspective view of a modified version of the filter assembly of FIG. 12.

FIG. 13 is an exploded perspective view of a filter assembly 500' according to further embodiments of the present invention. As can be seen by comparing FIGS. 12 and 13, the filter assembly 500' is almost identical to the filter assembly 500 that is described above. However, in the filter assembly 500', both resonator plates 550, 560 are formed integrally with the frame 520'. For example, the frame 520' and the first and second resonator plates 550, 560 may be die cast as a single, monolithic structure. In the embodiment of FIG. 13, the ledge 522 that is included in filter assembly 500 may be omitted. In some embodiments, one or both of the top and bottom covers 530, 540 may also be formed integrally along with the frame 520' and the first and second resonator plates 550, 560 in, for example, a die casting operation.

Figure 14:
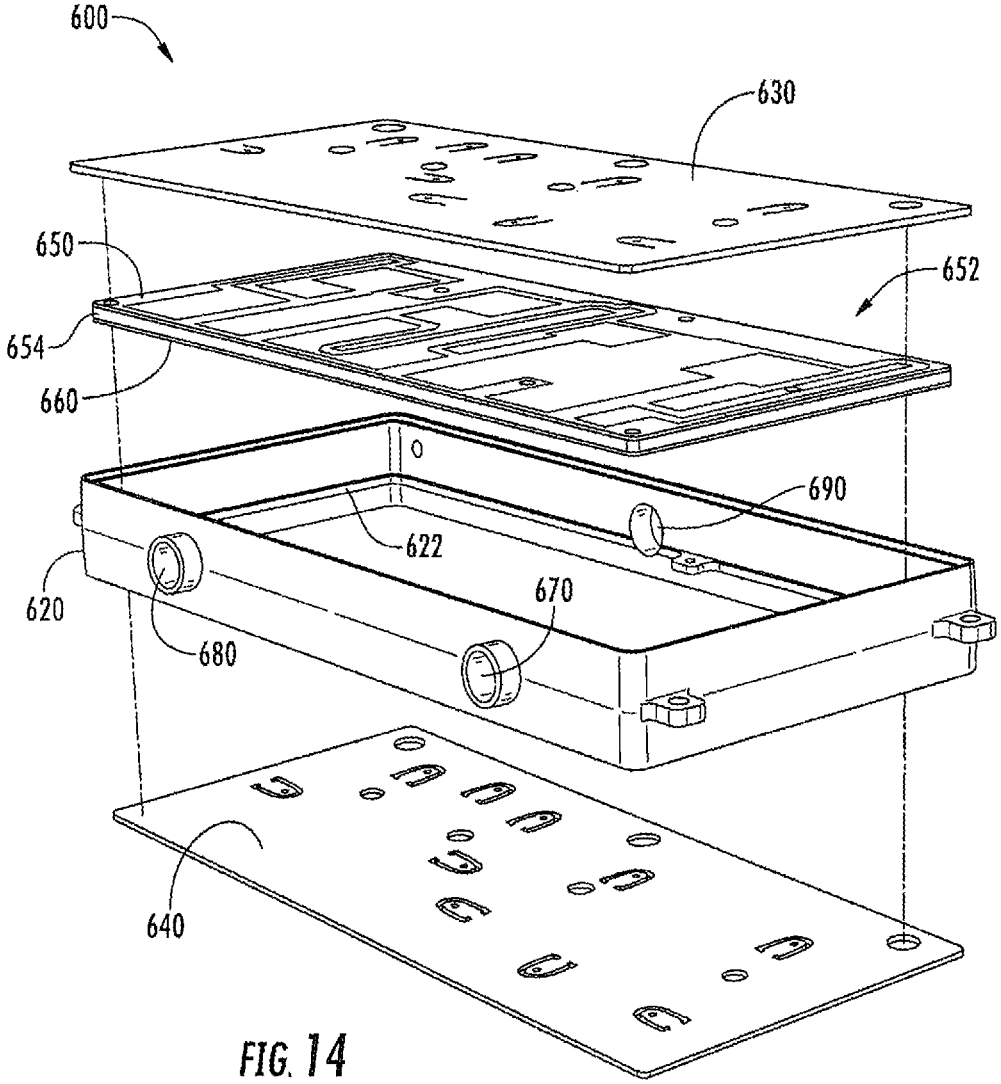
FIG. 14 is an exploded perspective view of a filter assembly according to still further embodiments of the present invention

Pursuant to still further embodiments of the present invention, filters may be provided that implement one or more of the resonator plates using printed circuit boards. FIG. 14 is an exploded perspective view of a filter assembly 600 according to embodiments of the present invention that uses a printed circuit board resonator plate implementation. Herein, the term "printed circuit board" is used broadly to refer to any substrate having at least one patterned conductive layer thereon.

As shown in FIG. 14, the filter assembly 600 is similar to the filter assembly 100 that is discussed above with reference to FIGS. 5-7. The filter assembly 600 includes a housing 610 that comprises a frame 620, a top cover 630 and a bottom cover 640. Filter assembly 600 further includes a pair of individual ports 670, 680 and a common port 690. The top and bottom covers 630, 640 and the ports 670, 680, 690 may be identical to the respective corresponding covers 130, 140 and ports 170, 180, 190 of the filter assembly 100, and hence further description thereof will be omitted. The frame 620 may be identical to the frame 120 of filter assembly 100. While the frame 620 includes a ledge 622, it will be appreciated that the ledge 622 may be omitted in some embodiments or may be located lower or higher along the sidewalls 616.

The filter assembly 600 further includes a printed circuit board 652. The printed circuit board 652 may be mounted to the ledge 622 (if provided) by, for example, soldering. In such embodiments, the face of the printed circuit board 652 that contacts the ledge 622 may have a copper (or other metal) border that directly contacts the ledge 622 to facilitate soldering the printed circuit board 652 to the ledge 622. Other mechanisms may be used in other embodiments to mount the printed circuit board 652 within the housing 610.

The printed circuit board 652 in the depicted embodiment comprises a two-sided printed circuit board that has patterned conductive layers on both top and bottom surfaces of a dielectric substrate 654. The patterned conductive layer on the top side of dielectric substrate 654 may comprise a first resonator plate 650, and the patterned conductive layer on the bottom side of dielectric substrate 654 may comprise a second resonator plate 660. The patterned conductive layers that comprise the respective first and second resonator plates 650, 660 may be formed by etching hole patterns in respective conductive sheets (e.g., copper sheets) that are formed on the respective top and bottom surfaces of the dielectric substrate 654. The hole patterns may, for example, be identical to the hole patterns included in the resonator plates 150, 160. In some embodiments, portions of the dielectric substrate 654 may also be removed such as portions between regions where the respective top and bottom conductive sheets are both etched. Removing such portions of the dielectric substrate 654 may increase the coupling between the resonator plates 650, 660, but is not required.

While the top cover 630 and bottom cover 640 are both separate from the frame 620 in the embodiment depicted above, it will be appreciated that in other embodiments either the top cover 630 or the bottom cover 640 could be die cast as part of the frame 620.

Figure 15:
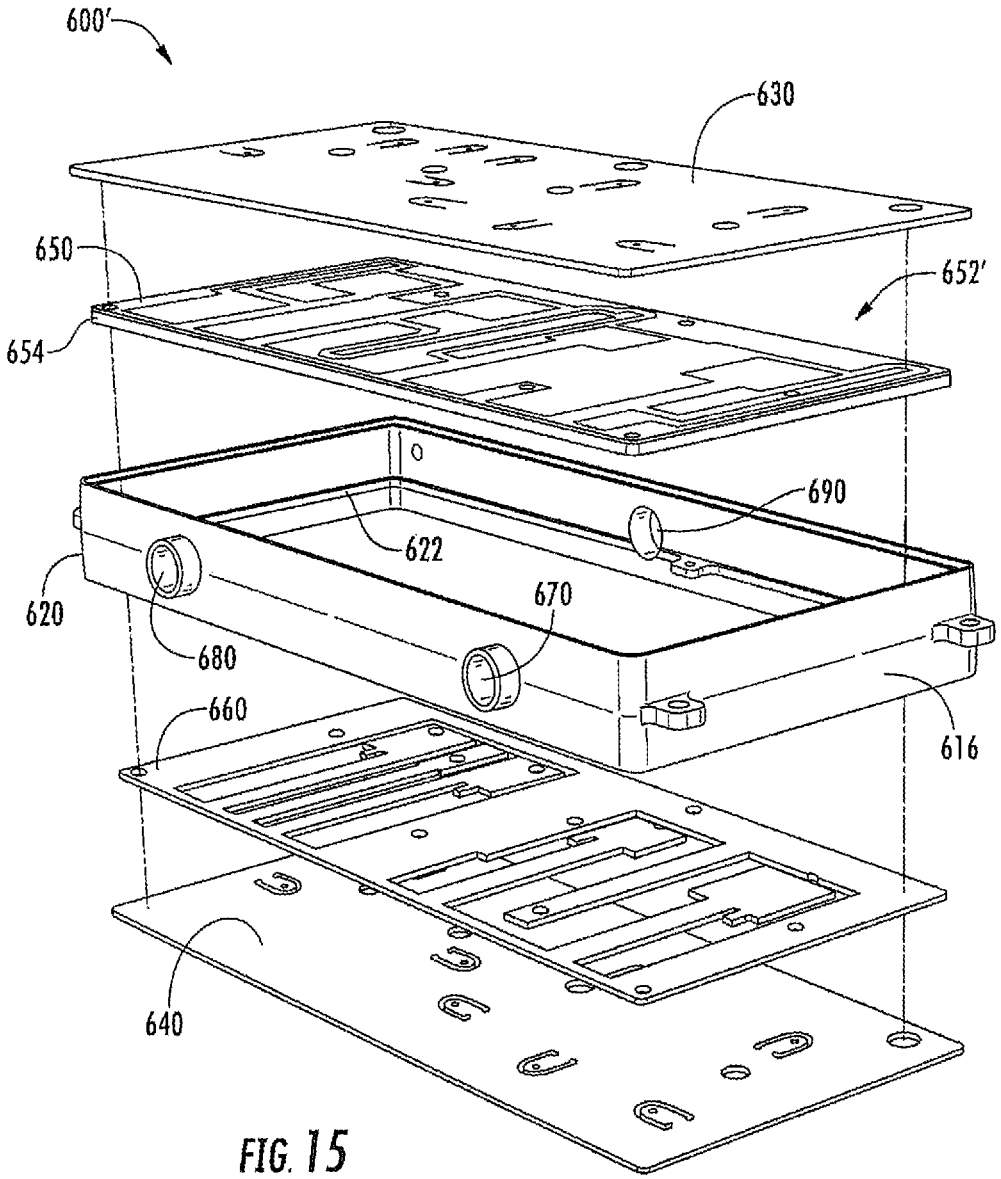
FIG. 15 is an exploded perspective view of the filter assembly of FIG. 14.

FIG. 15 is an exploded perspective view of a filter assembly 600' according to further embodiments of the present invention. The filter assembly 600' is similar to the filter assembly 600, except that the filter assembly 600' includes a single sided printed circuit board 652' that only has a patterned conductive layer formed on one side thereof that acts as one of the first and second resonator plates 650, 660. A stamped metal plate (or a metal plate that is integral with the frame 620) may be used as the other of the first and second resonator plates 650, 660. In the depicted embodiment, the patterned conductive layer on the printed circuit board 652 is used to implement the first resonator plate 650 and a separate second resonator plate 660 that is formed of a metal sheet is provided. In other embodiments, this arrangement may be reversed, with the printed circuit board being used to implement the second resonator plate 660 and a stamped metal sheet being used to implement the first resonator plate 650. It will also be appreciated that the patterned conductive layer may be formed on either the top or bottom side of the printed circuit board 652' in each of the above embodiments. The height of the ledge 622 (if provided) may be adjusted based on the location of the patterned conductive layer on the printed circuit board 652' (i.e., either on the top or the bottom) to ensure a proper spacing between the resonator plates 650, 660 to achieve a desired filter response.

In embodiments of the present invention that use printed circuit board based resonator plates, tuning stubs would typically not be provided on the printed circuit board. However, tuning could still be performed by, for example, etching away additional portions of the conductive pattern to decrease coupling and/or by soldering or otherwise attaching metal onto the printed circuit board to increase coupling (e.g., soldering small pieces of foil).

Figure 16:
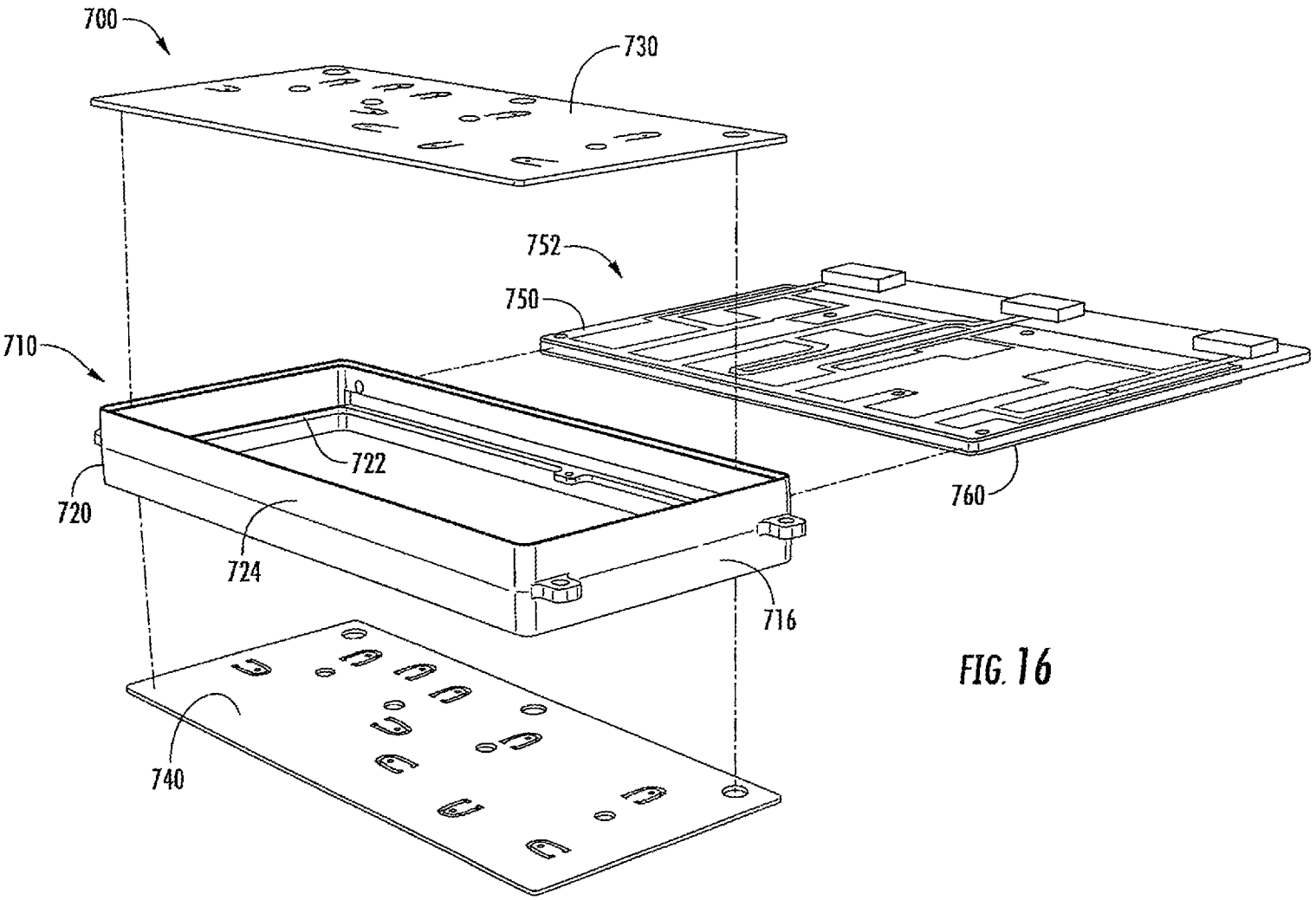
FIG. 16 is a perspective view of a filter assembly according to yet additional embodiments of the present invention.

FIG. 16 is a perspective view of a filter assembly 700 according to still further embodiments of the present invention. The filter assembly 700 may be similar to the filter assembly 600 described above that uses a printed circuit board 652 to implement the resonator plates 650, 660. However, in the filter assembly 700, a much larger printed circuit board 752 is used, and the frame 720 includes a slot 724 along a sidewall thereof that allows a first portion 754 of the printed circuit board 752 to be inserted within the housing 710. The first portion 754 of the printed circuit board 720 that is received within the housing 710 may include conductive patterns that form first and second resonator plates 750, 760. Since a larger printed circuit board 752 is used that extends into the housing 710, it is possible to implement other elements of, for example, an antenna on a second portion 756 of the printed circuit board 752 that extends outside the housing 710.

Since the printed circuit board 752 extends into the housing 710, the individual ports 670, 680 that are included in filter assembly 600 may be omitted and replaced with traces or other transmission line structures on the printed circuit board 752 that extend from the second portion 756 of printed circuit board 752 to the first portion 754 of the printed circuit board 752 that is within the housing 710. The common port 690 of filter assembly 600 may alternatively and/or additionally be omitted and replaced with traces or other transmission line structures on the printed circuit board 752 that extend from the second portion 756 of printed circuit board 752 to the first portion 754 of the printed circuit board 752 that is within the housing 710. Replacing one or more of the ports 670, 680, 690 of filter assembly 600 with printed circuit board transmission lines as is done in the filter assembly 700 of FIG. 16 may advantageously reduce the number of solder joints required, simplifying the manufacture of the antenna and eliminating various potential points of PIM distortion. This will be explained in further detail with reference to FIGS. 17A and 17B.

Figure 17A:
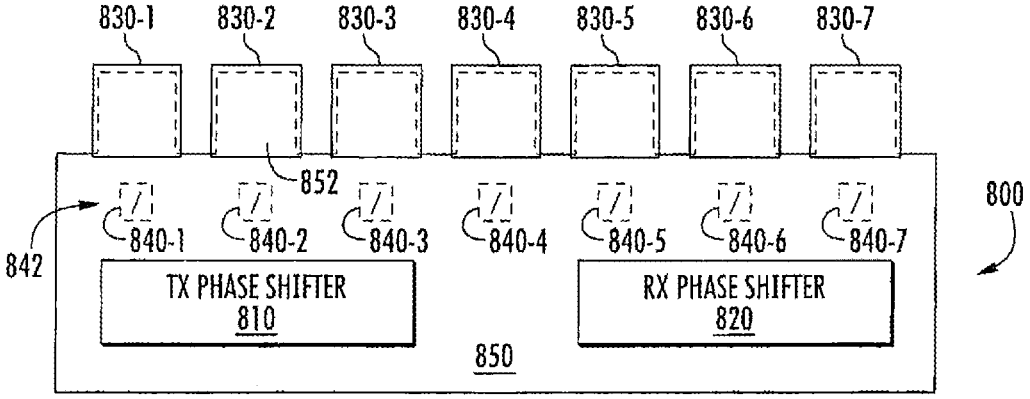
FIG. 17A is a schematic structural block diagram of an antenna that includes the filter assembly of FIG. 16.
Figure 17B:
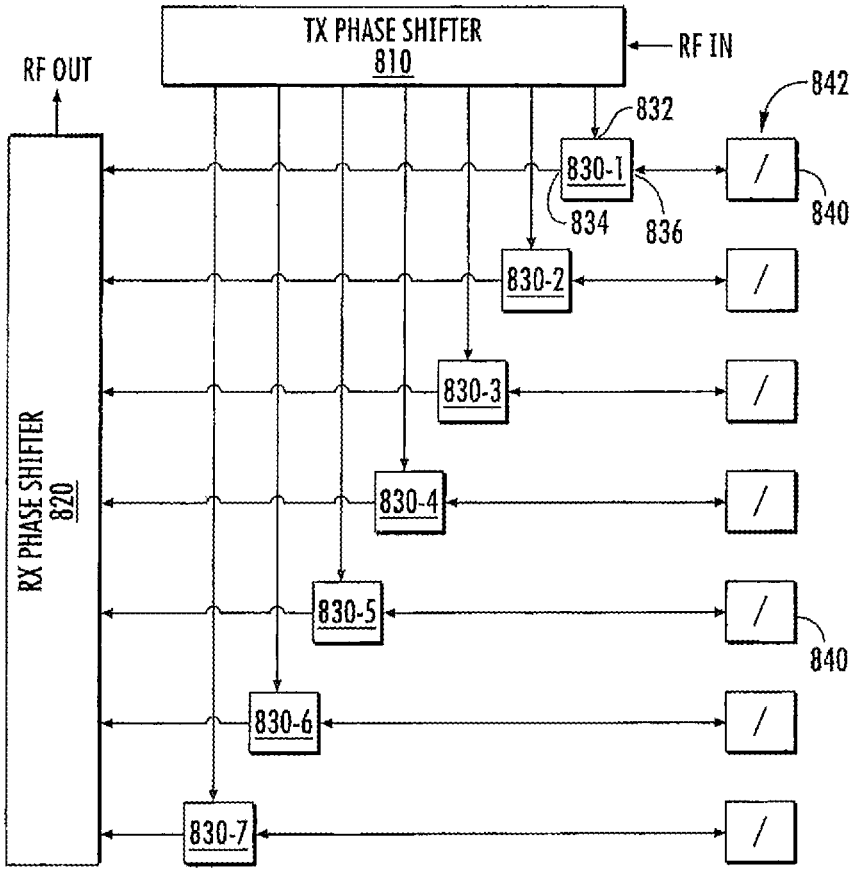
FIG. 17B is a schematic block diagram of the antenna of FIG. 17A that shows illustrates the RF communications paths thereof.

In particular, FIG. 17A is a block diagram that schematically illustrates an antenna 800 that includes a plurality of filter assemblies 830 that are implemented using a single, common printed circuit board. Each filter assembly 830 may have the design of the filter assembly 700 of FIG. 16. FIG. 17B is a schematic block diagram that illustrates the connections between the phase shifters, filter assemblies and radiating elements included in the antenna 800. The antenna 800 may be simpler to manufacture and generate less PIM distortion than comparable conventional antennas.

Referring first to FIGS. 17A and 17B, the antenna 800 includes a transmit path phase shifter 810, a receive path phase shifter 820, a plurality of filter assemblies 830-1 through 830-7 and a plurality of radiating elements 840-1 through 840-7. These elements are all mounted on a common printed circuit board 850. In the depicted embodiment, the phase shifters 810, 820 and the filter assemblies 830-1 through 830-7 are implemented on one side of the printed circuit board 850 and the radiating elements 840-1 through 840-7 are mounted to extend from the other side of the printed circuit board 850, and hence are illustrated using dashed lines. The radiating elements 840 may be aligned to form a linear array 842. The antenna 800 may include numerous other elements such as, for example, remote electronic down-tilt units, input connectors, processing units and the like that are known to those of skill in the art. These additional elements are not shown in FIGS. 17A and 17B to simplify the drawings.

As shown in FIG. 17B, the transmit path phase shifter 810 may, for example, comprise a 1×7 phase shifter that has a single input port and seven output ports. Each output port of the transmit path phase shifter 810 may be connected to a respective one of the filter assemblies 830. Likewise, the receive path phase shifter 820 may, for example, comprise a 1×7 phase shifter that has seven input ports and a single output port. Each input port of the receive path phase shifter 810 may also be connected to a respective one of the filter assemblies 830. The transmit phase shifter 820 may subdivide an RF signal that is received from a radio into seven sub-components and may apply a linear phase taper across the seven sub-components in order to electronically alter the elevation angle of the antenna beam formed by the radiating elements 840, in a manner known to those of skill in the art. The receive phase shifter 820 may similarly subdivide a received RF signal into seven sub-components and may apply a linear phase taper across the seven sub-components in order to electronically alter the elevation angle of the receive antenna beam formed by the linear array 842. The transmit and receive phase shifters 810, 820 may be adjustable and may be adjusted from a remote location.

Each filter assembly 830 may comprise a duplexer, and may be used to separate/combine RF signals in the transmit frequency band from RF signals in the receive frequency band. Each duplexer 830 may have a transmit port 832, a receive port 834 and a common port 836. The common port 836 of each duplexer 830 may be connected to a respective one of the radiating elements 840. The common port 836 may be configured to pass signals in both the transmit and receive frequency bands of the linear array 842. The transmit port 832 of each duplexer 830 may be connected to a respective one of the outputs of the transmit path phase shifter 810 and may be configured to pass signals in the transmit frequency band of the linear array 842 while not passing signals in the receive frequency band of the linear array 842. The receive port 834 of each duplexer 830 may be configured to pass signals in the receive frequency band of the linear array 842 while not passing signals in the transmit frequency band of the linear array 842.

Each radiating element 840 may comprise, for example, a dipole radiating element. While more typically, cross-dipole or other cross-polarized radiating elements are used that include two radiators that radiate at orthogonal polarizations, in FIGS. 17A and 17B standard dipole radiating elements are shown to simplify this example. It will be appreciated that if cross-dipole radiating elements are used, the phase shifters 810, 820 and the filter assemblies 830 would be replicated for the orthogonal polarization. It will also be appreciated that any appropriate radiating element may be used including, for example, patch radiating elements, horn radiating elements and other radiating elements known to those of skill in the art. The radiating elements 840 may be arranged to form a linear array 842 as shown. More than one linear array 842 of radiating elements 840 may be provided on the antenna 800. The circuitry shown in FIGS. 17A-17B may be replicated for each linear array.

Each duplexer 830 may, for example, have the design of the filter assembly 700 discussed above. As shown in FIGS. 17A and 17B, all seven of the duplexers 830 may be implemented on a common printed circuit board 850. The printed circuit board may include a plurality of fingers 852. Each finger 852 may be received within the housing of a respective one of the duplexers 830, thereby allowing all seven duplexers to be formed on the common printed circuit board 850.

The phase shifters 810, 820 and the radiating elements 840 are also formed and/or mounted on the common printed circuit board 850. As a result, the communications paths between the input/output ports of the phase shifters 810, 820 and the duplexers 830 may be printed circuit board transmission paths such as conductive traces on the printed circuit board 850. The communications paths between the duplexers 830 and the respective radiating elements 840 may also be implemented as printed circuit board transmission paths. As a result, the soldered coaxial cabling connections that are used in conventional antennas to connect the phase shifters and radiating elements to the duplexers may be omitted. This may reduce the cost of the antenna, simplify the manufacture thereof, and remove many possible sources of PIM distortion degradation.

Figure 18:
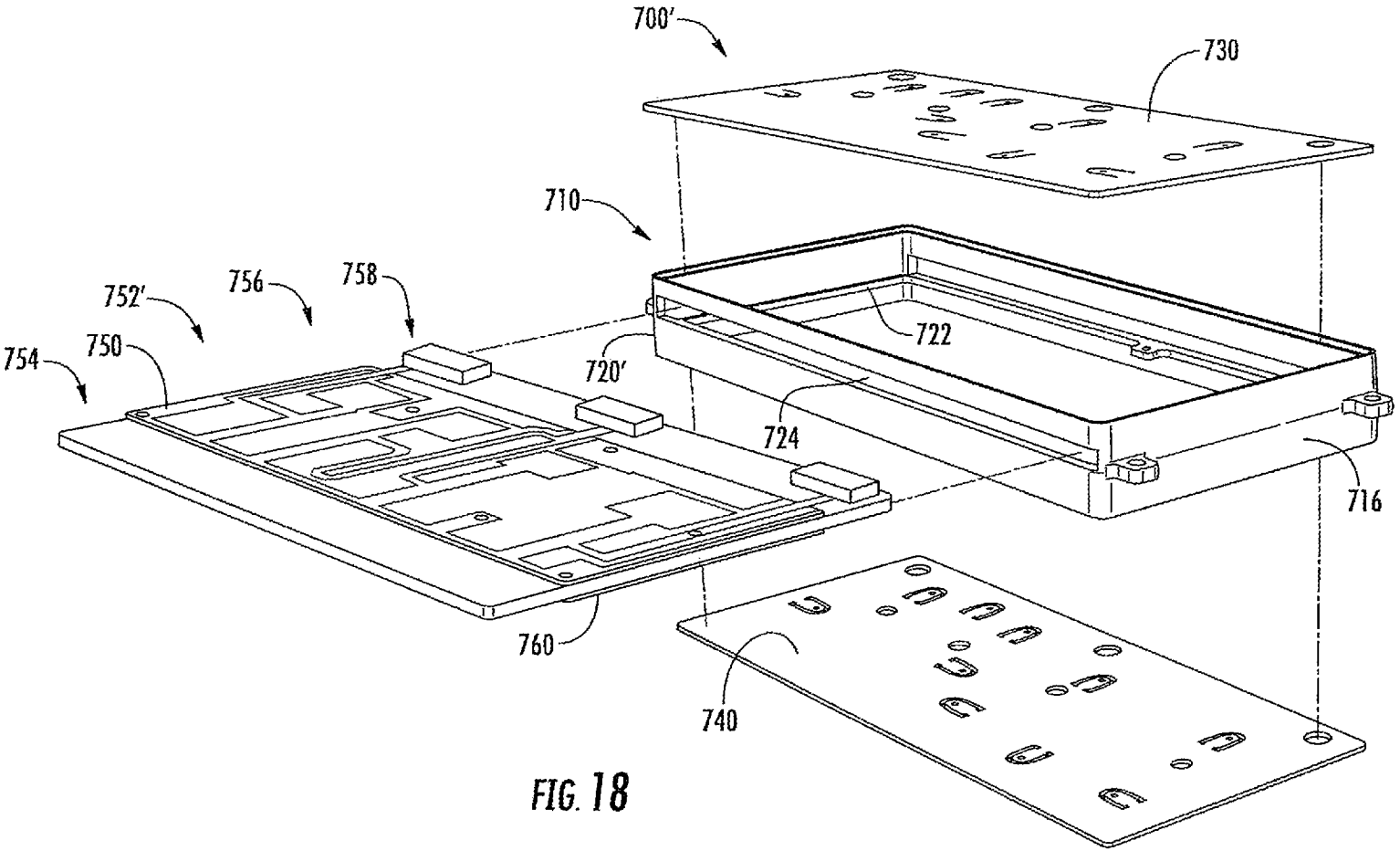
FIG. 18 is a perspective view of a filter assembly according to still further embodiments of the present invention.

FIG. 18 is a perspective view of a filter assembly 700' according to still further embodiments of the present invention. The filter assembly 700' may be similar to the filter assembly 700 described above, except that the housing 720' of filter assembly 700' includes slots 722 on two opposed sides thereof, and the printed circuit board 752' extends through both slots 722 so that the printed circuit board 752 has a second central portion 756 within the housing 710 and first and third end portions 754, 758 that extend outside of the housing 720'.

Figure 19:
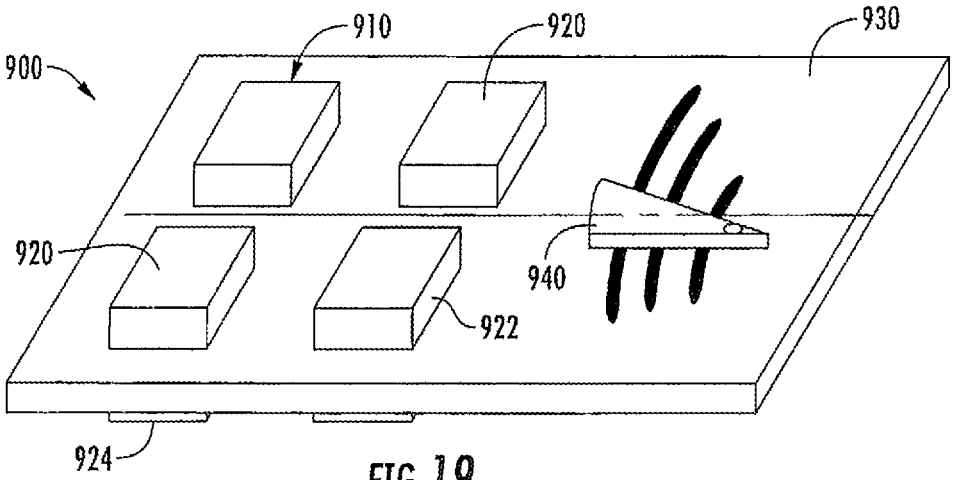
FIG. 19 is a perspective view of a filter assembly according to still further embodiments of the present invention.

FIG. 19 is a perspective view of an assembly 900 according to still further embodiments of the present invention. The assembly 900 includes a plurality of filter assemblies 910 that are formed on a common printed circuit board 930. Each filter assembly 910 may be similar to the filter assemblies 700 and 700' that are discussed above in that the filter assemblies 910 implement the resonator plates thereof using conductive patterns on the top and bottom surfaces of a portion of the printed circuit board 930 that includes other components. However, in the filter assemblies 910, the housings 920 thereof comprise first and second open-ended boxes 922, 924 that are soldered to the respective top and bottom surfaces of the printed circuit board 930 to cover the respective first and second resonator plates (not visible in FIG. 19). The first and second resonator plates are implemented as conductive patterns on the portions of the printed circuit board 930 that are within the respective housings 920. Each open ended box 922, 924 may comprise, for example, a metal box having four sidewalls and a cover on one end thereof. The metal boxes 922, 924 may be soldered in place over the respective first and second resonator plates to form the filter assemblies 910. In all other respects, the filter assemblies 910 may be identical to, for example, either the filter assembly 700 or the filter assembly 700' that are discussed above. A plurality of the filters 910 may be included on the printed circuit board 930, as is schematically shown in FIG. 19. Additional elements of an antenna such as, for example, a phase shifter 940 may also be implemented on the printed circuit board 930. This may advantageously allow for a reduction in the number of coaxial cables and/or soldered connections, as discussed above with reference to FIGS. 17A and 17B. It will be appreciated that additional phase shifters, radiating elements and the like may also be mounted on printed circuit board in the same manner discussed above with reference to FIGS. 17A-17B.

Pursuant to further embodiments of the present invention, filters may be provided that have tuning elements that exhibit enhanced performance. In some embodiments, these tuning elements may be formed in an exterior wall of the filter housing such as, for example, in a top cover, a bottom cover or a sidewall of the filter. Moreover, the tuning elements may be easier to adjust than conventional tuning stubs, cheaper to manufacture, more mechanically robust and/or better performing than various conventional tuning elements such as tuning stubs or tuning screws.

Figure 20:
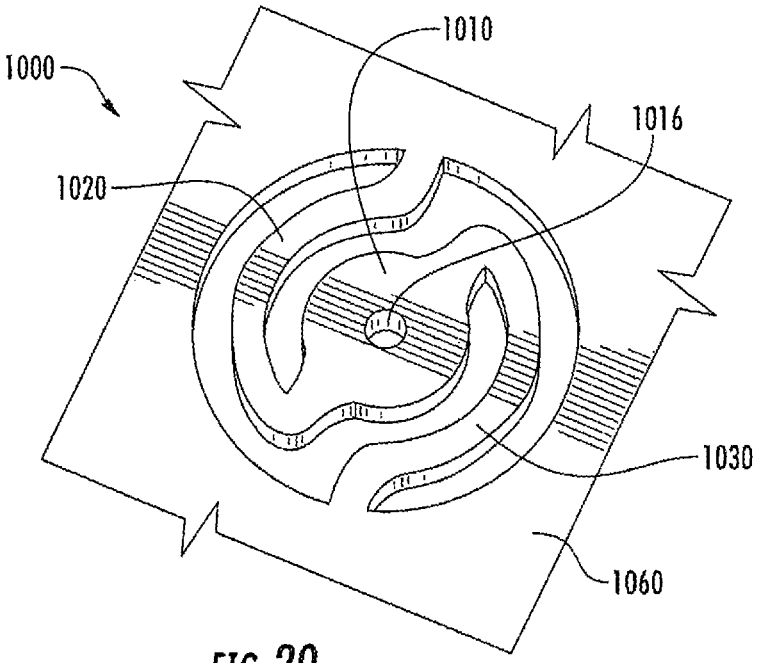
FIG. 20 is a top view of a twistable tuning element for a filter according to embodiments of the present invention.
Figure 21:
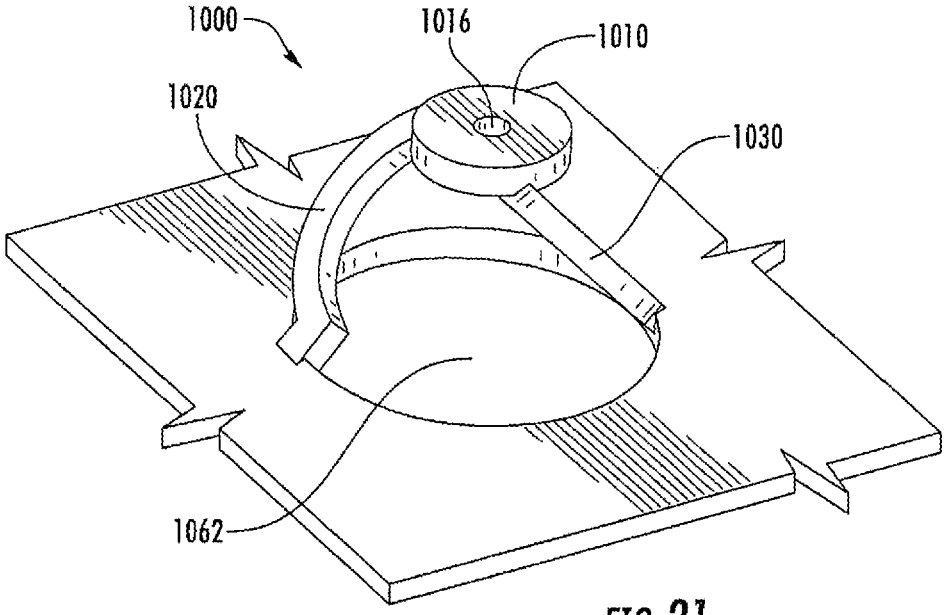
FIG. 21 is a perspective bottom view of the tuning element of FIG. 20 after the tuning element has been moved downwardly to tune the filter.
Figure 22:
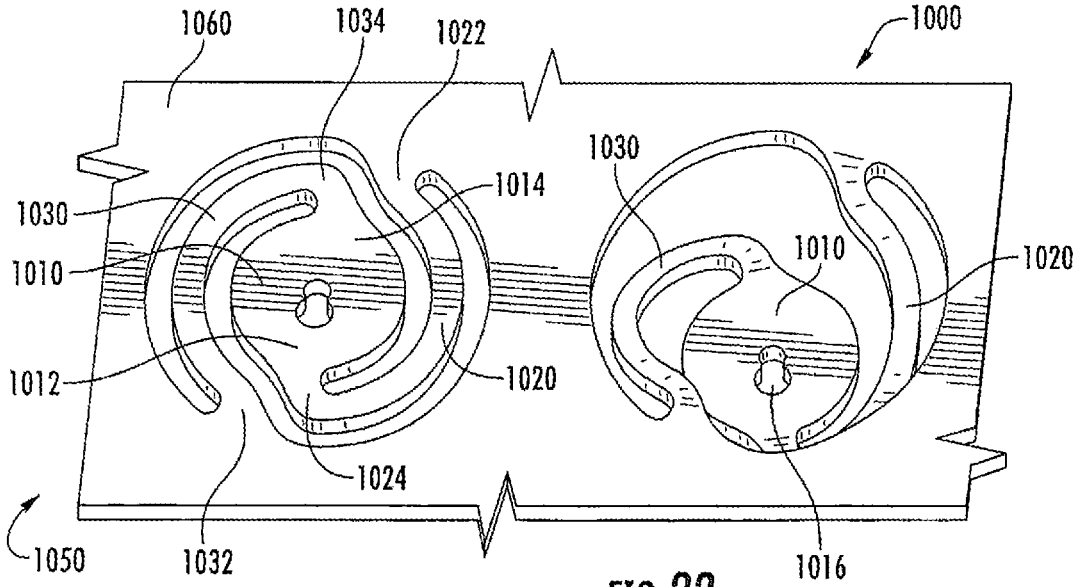
FIG. 22 is a top view of a top cover of a filter that has a plurality of the twistable tuning elements of FIG. 20 formed therein.

FIG. 20 is a top view of a tuning element 1000 for a filter according to certain embodiments of the present invention. FIG. 21 is a perspective bottom view of the tuning element 1000 of FIG. 20 after the tuning element 1000 has been moved downwardly to tune the filter. FIG. 22 is a top view of a top cover of a filter that has a plurality of the tuning elements of FIG. 20 formed therein. In FIG. 22, some of the tuning elements 1000 are in their original position as manufactured while others of the tuning elements 1000 have been moved downwardly to tune the filter.

As shown in FIGS. 20-22, the tuning element 1000 is provided in an opening 1062 in a cover 1060 of a housing of a filter 1050. In FIG. 22, the cover 1060 is a top cover 1060 of the filter housing 1050, but it will be appreciated that the tuning element 1000 may be formed in a bottom cover, a frame and/or on resonator plates of the filter.

The tuning element 1000 comprises a coupling element 1010 and first and second arms 1020, 1030. The first arm 1020 connects a first side 1012 of the coupling element 1010 to the top cover 1060 while the second arm 1030 connects a second side 1014 of the coupling element 1010 to the top cover 1060. In the depicted embodiment, the coupling element 1010 comprises a generally circular piece of sheet metal that has a hole 1016 punched therein. The first and second arms 1020, 1030 are each implemented as curved arms. A first end 1022 of the first arm 1020 connects to a sidewall of the opening 1062 while the second end 1024 of the first arm 1020 connects to the coupling element 1010. Likewise, a first end 1032 of the second arm 1030 connects to the sidewall of the opening 1062 while the second end 1034 of the second arm 1030 connects to the coupling element 1010. The second ends 1024, 1034 of the first and second arms 1020, 1030 connect to opposite ends of the coupling element 1010. Moreover, each of the first and second arms 1020, 1030 curve around more than a third of the circumference of the circular coupling element 1010 so that the first and second ends 1022, 1032; 1024, 1034 of each arm 1020, 1030 are almost on opposite sides of the circular coupling element 1010. As will be explained in detail below, this design for the tuning element 1000 allows the tuning element 1000 to twist when moved along an axis that extends through the center of the opening 1062 that is perpendicular to the plane defined by the top cover 1060 of the filter housing 1050.

The tuning element 1000 may be formed by cutting generally arc-shaped portions out of a metal sheet such as the top cover 1060. As can be seen in FIGS. 20 and 22, two arc-shaped cut-outs that each have a relatively constant diameter and that each extend through about 330 degrees may be formed by, for example, laser cutting or any other appropriate cutting or punching technique. It will be appreciated, however, that in other embodiments the arc-shaped cut-outs may have non-constant diameters and/or may extend for different lengths. For example, if the circular coupling element 1010 is replaced with an elliptical or rectangular coupling element, the arc-shaped cut-outs would may have non-constant diameters. It will also be appreciated that more than two arms may be used in other embodiments, which will decrease the length of each arc-shaped cut-out. For example, in an alternate example embodiment, three arms could be provided. It will also be appreciated that the arms 1020, 1030 need not be curved in all embodiments.

The tuning element 1000 illustrated in FIGS. 20-22 may be used to tune an associated filter as follows. A force may be applied to the circular coupling element 1010 in a direction that is generally perpendicular to the plane defined by the wall 1060 of the housing of the filter 1050 that the tuning element 1000 is formed in. This force may cause the coupling element 1010 to be displaced downwardly into an internal cavity of the filter. Since the arms 1020, 1030, have fixed lengths, as the coupling element 1010 moves downwardly it twists so that the distal end 1024, 1034 of each arm 1020, 1030 twists in the direction of the base 1022, 1032 of the respective arm 1020, 1030. As a result, the coupling element 1010 may move downward without significant axial movement (i.e., a center of the coupling element 1010 may remain generally vertically aligned with a center of the opening 1062 in the cover 1060). Moreover, the coupling element 1010 may remain generally parallel to the plane defined by the cover 1060 as the coupling element 1010 moves downwardly. As a result, the coupling element 1010 may remain generally parallel to a resonator plate or other structure that is disposed in a cavity underneath the tuning element 1000, and may thereby exhibit increased capacitive coupling because of this parallel arrangement. This can be seen in FIGS. 21 and 22, which show several of the tuning elements 1010 after they have been displaced within the cavity of a filter to tune the filter.

In the event that the coupling element 1010 is displaced too far downwardly during the tuning process (at which point the increased capacitive coupling will stop helping improve the performance of the filter and will start to degrade the performance thereof instead), the short end of an L-shaped probe may be inserted within the hole 1016 in the coupling element 1010 and an upward force may be applied to pull the coupling element 1010 upwardly to decrease the coupling. The filter 1050 may be tested with the coupling elements 1010 in various positions to tune the filter 1050 until a minimum level of performance has been achieved or surpassed. Once the filter 1050 is tuned, stickers may be placed over the openings 1062 to prevent debris from falling inside the filter 1050.

Figure 23A:
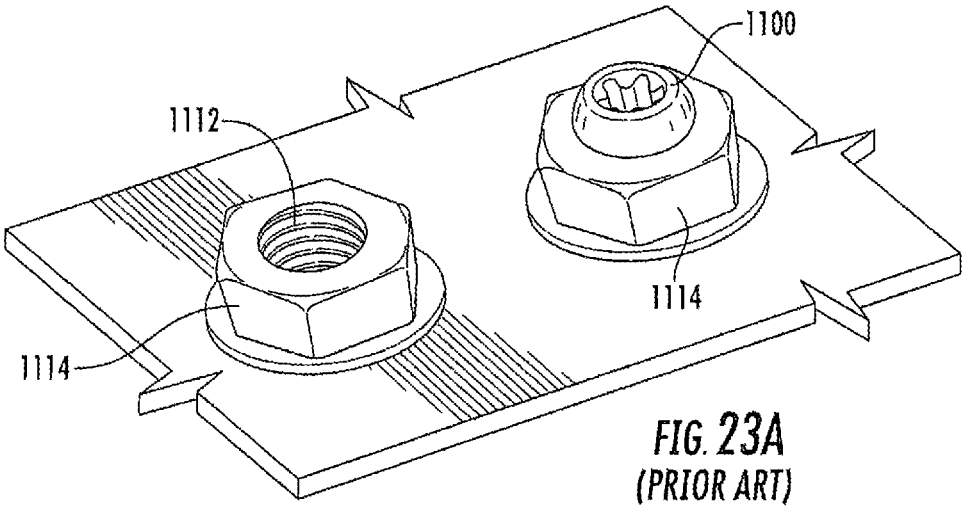
FIG. 23A (PRIOR ART)
FIGS. 23A-23D are perspective and plan views of conventional filter tuning elements.

FIGS. 23A-23D are perspective and plan views of conventional filter tuning elements. Referring first to FIG. 23A, a top cover 1110 of a filter housing is depicted that includes a plurality of conventional tuning screws 1100 mounted therein. The top cover 1110 has a plurality of apertures 1112 extending therethrough (one of the tuning screws 1110 has been removed to show an aperture 1112). A threaded bushing 1114 may be soldered above each aperture 1112. The tuning screws 1100 are threaded through the respective threaded bushings 1114 to extend into the respective apertures 1112. The tuning screws 1100 can readily be threaded further into and further out of the threaded bushings 1114, and hence into and out of the cavity of the filter, and therefore may facilitate very precise tuning of the filter. The tuning screws 1100 may be adjusted many times without any degradation in performance. As the tuning screws 1100 are inserted into the threaded bushings, there are no openings to permit leakage of electromagnetic radiation. Additionally, the tuning screws 1100 are amenable to automatic tuning. Automatic tuning refers to a process where equipment is used to displace tuning elements on a filter and to measure the response of the filter during or after such displacement. The tuning screws 1100 are readily adaptable to automatic tuning as automated equipment is readily available that can be used to tighten and loosen screws. While not shown, in other embodiments a thicker top cover 1110 may be used that has threaded apertures formed therein which may eliminate the need for the threaded bushings 1114.

The tuning screws 1100 and threaded bushings 1114, however, increase the materials cost of the filter, and the need to solder the bushings 1114 above the apertures 112 increases manufacturing costs. Additionally, the solder connections are a potential source of PIM distortion. In the alternative embodiment that replaces the apertures 1112 and threaded bushings 1114 with threaded apertures, the thicker top cover 1110 may increase both the weight and materials cost of the filter, as do the cost of the tuning screws 1100. The tuning screws 1100 are also potential source of PIM distortion due to the potential for inconsistent metal-to-metal contacts and/or because small metal shavings may be cut from the tuning screws 1100 or the threaded bushings 1114 (or threaded aperture) when the tuning screws 1100 are threaded within the respective bushings 1114, and these small metal shavings may fall into the filter. Tuning screws 1100 may also be susceptible to movement in response to vibration which can negatively affect tuning. Thus, while tuning screws 1100 may provide very accurate tuning, they are expensive to implement and have potential performance disadvantages.

Figure 23B:
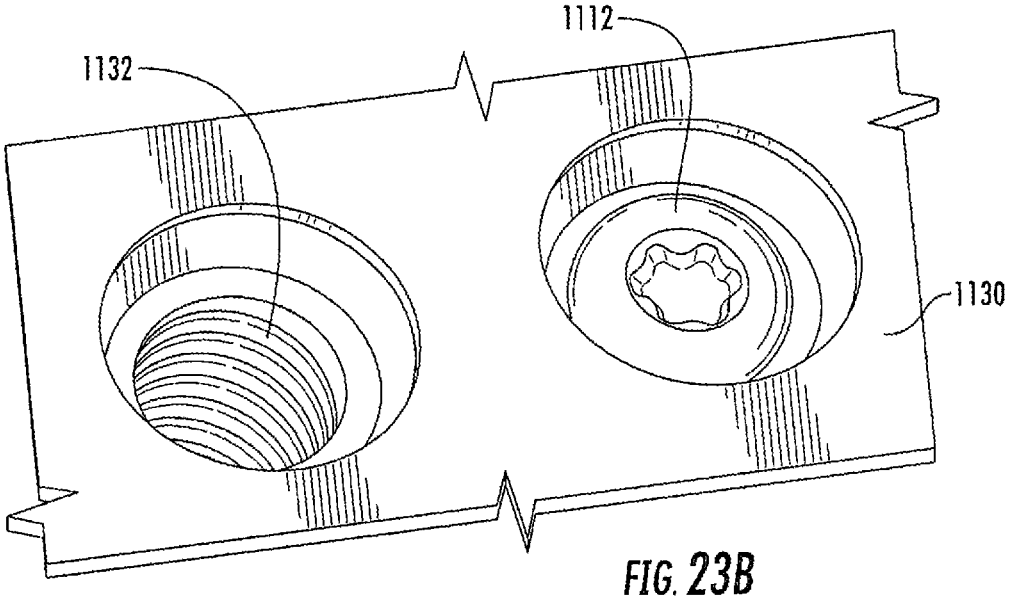
FIG. 23B (PRIOR ART)

Referring to FIG. 23B, a cover 1130 of a filter housing is depicted that includes a plurality of self-locking tuning screws 1120 mounted therein. The self-locking tuning screws 1120 are mounted in respective threaded apertures 1132 in the cover 1130. The self-locking tuning screws 1120 may again provide very precise tuning of the filter, and may be adjusted a relatively large number of times without degradation in performance. The self-locking tuning screws 1120 are very amenable to automatic tuning and do not include any openings that allow leakage of electromagnetic radiation. However, the self-locking tuning screws 1120 have each of the above-discussed disadvantages of normal tuning screws 1100, namely increased cost, the need for a thicker cover and the tuning screws 1120 are a possible source for PIM distortion due to metal shavings, loose screws and/or inconsistent metal-to-metal contact.

Figure 23C:
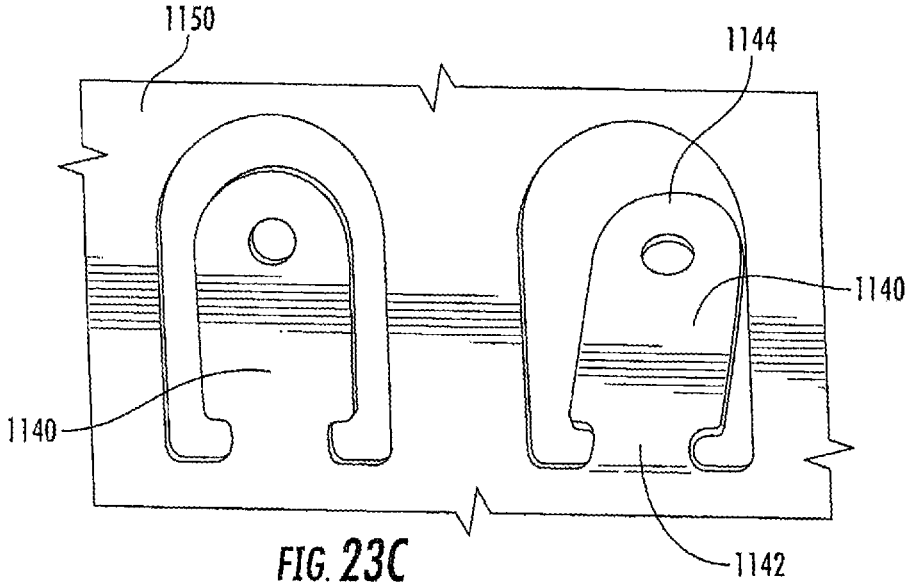
FIG. 23C (PRIOR ART)

FIG. 23C is a plan view of a conventional single-bend tuning stub 1140 that is formed in a top cover 1150 of a filter housing. As shown in FIG. 23C, the single-bend tuning stub 1140 comprises a cantilevered finger having a base 1142 that attaches to the top cover 1150 and a distal end 1144 that is opposite the base 1142. A hole 1146 may be formed in the distal end 1144 of the single-bend tuning stub 1140. The single-bend tuning stub 1140 may be formed simply by cutting a U-shaped area out of the top cover 1150. The base 1142 of the single-bend tuning stub 1140 may be narrower than the remainder of the single-bend tuning stub 1140 to make it easier to bend the single-bend tuning stub 1140. The single-bend tuning stub 1140 may be very robust mechanically, and may be very simple and inexpensive to form.

In order to tune a filter, the single-bend tuning stub 1140 may be bent downwardly so that the distal end 1144 of the tuning stub 1140 is received into the cavity of the filter. The single-bend tuning stub 1140 acts to tune the filter by changing the amount of coupling between the element of the filter that includes the tuning stub 1140 (here the top cover 1150) and another element of the filter (e.g., a resonator plate). Since only the distal end of the single-bend tuning stub 1140 moves significantly closer to the other element of the filter, the tuning effect of the single-bend tuning stub 1140 may be very low as it will not significantly increase the amount of capacitive coupling. As a result, a larger number of single-bend tuning stubs 1140 may be required, which increases manufacturing costs. Additionally, as the single-bend tuning stub 1140 is bent downwardly, a large opening appears in the top cover 1150 which may allow electromagnetic radiation to escape. This effect may be aggravated by the fact that a relatively large number of single-bend tuning stubs 1140 may be required, meaning that a larger number of such openings may appear when the tuning stubs 1140 are adjusted to provide a significant increase in coupling. Moreover, whenever single-bend tuning stubs 1140 are used, micro-cracks may develop when the single-bend tuning stub 1140 is bent to effect the tuning. The development of such micro-cracks may, for example, occur if a particular single-bend tuning stub 1140 is bent a number of times. These micro-cracks can be a source of PIM distortion. Thus, while the single-bend tuning stub 1140 has the advantage of simplicity, the use of such single-bend tuning stubs 1140 may degrade the performance of the filter.

Figure 23D:
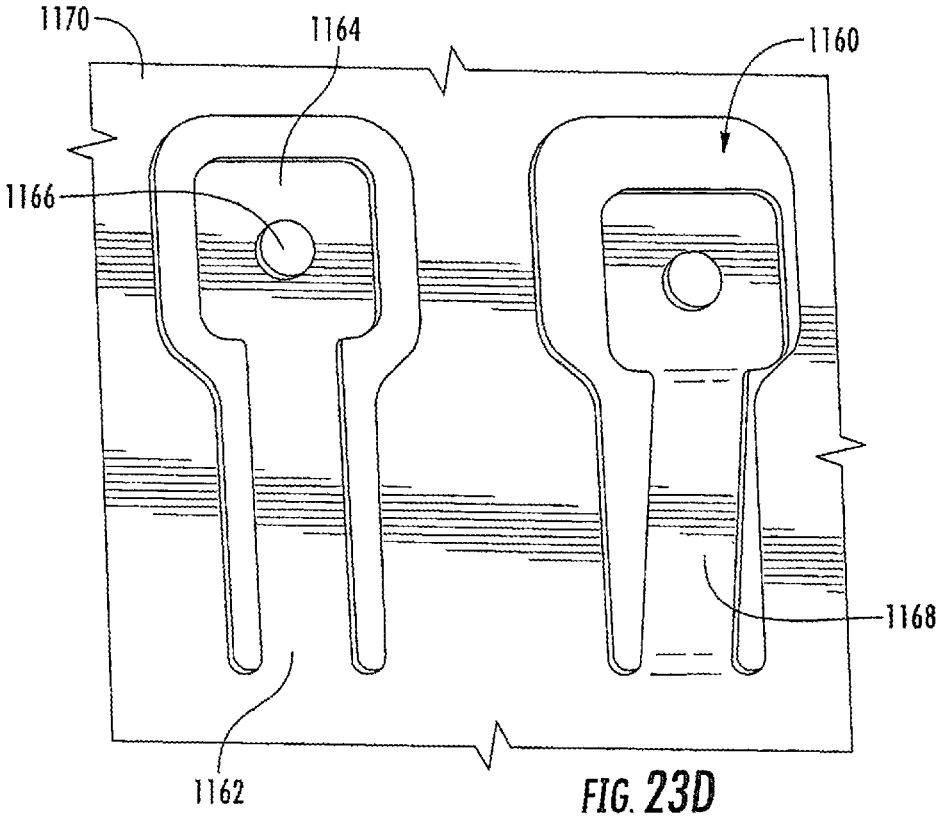
FIG. 23D (PRIOR ART)

FIG. 23D is a plan view of a conventional double-bend tuning stub 1160 that is formed in a top cover 1170 of a filter housing. As shown in FIG. 23D, the double-bend tuning stub 1160 is similar to the single-bend tuning stub 1140 in that the tuning stub 1160 includes a base 1162 and a distal end 1164 and may be formed by cutting an opening having the shape shown in FIG. 23D out of the top cover 1170. The double-bend tuning stub 1160, however, has a narrower finger portion 1168 (i.e., the portion between the base 1162 and the distal end 1164) and the distal end 1164 of the double-bend tuning stub 1160 is widened. In the depicted embodiment, the distal end 1164 has a rectangular shape, but any shape may be used. A hole 1166 may be formed in the distal end 1164 of the double-bend tuning stub 1160. The finger portion 1168 of the double-bend tuning stub 1160 may be bent in two locations, namely at the base 1162 and at the end of the finger portion 1168 (i.e., just before the widened distal end 1164). The first bend in the tuning stub 1160 adjacent the base 1162 may be used to change the distance between the distal end 1164 of the double-bend tuning stub 1160 and an underlying structure and the second bend in the double-bend tuning stub 1160 adjacent the distal end 1164 may be used to keep the widened distal end 1164 generally parallel to the underlying structure, regardless of the degree of the first bend. This may provide for increased capacitive coupling between the double-bend tuning stub 1160 and the underlying structure as compared to the single-bend tuning stub 1140 of FIG. 23C.

The double-bend tuning screw 1160 has a simple shape and may provide a significant tuning capability that is similar to a tuning screw, as the double-bend tuning stub 1160 may generate significant capacitive coupling. However, it is more cumbersome to use as it requires multiple bends, and it is less mechanically rigid and hence more susceptible to de-tuning in response to vibrations and the like. The double-bend tuning stub 1160 also leaves a relatively large opening as the double-bend tuning stub 1160 is bent downwardly, which allows for leakage of electromagnetic radiation.

Referring again to FIG. 22, the twistable tuning element 1000 may exhibit a number of significant advantages over the above-described conventional tuning elements 1100, 1120, 1140, 1160. For example, the twistable tuning element 1000 may be much cheaper to implement as compared to the above-described tuning screws 1100, 1120, as the twistable tuning element 1000 does not require extra parts and may be formed by simply cutting or punching a metal sheet. The twistable tuning element 1000 may be less likely to act as a source of PIM distortion and may be implemented on a thinner cover than some of the tuning screw embodiments. The twistable tuning element 1000 may also have good mechanical rigidity and may exhibit performance comparable to the tuning screws.

As compared to the tuning stubs 1140, 1160, the twistable tuning element 1000 may exhibit only axial movement (i.e., movement along an axis that is perpendicular to the plane defined by the wall that the tuning element 1000 is formed in), which may simplify the tuning process. Additionally, the twistable tuning element 1000 may exhibit lower levels of electromagnetic radiation leakage and provide a more pronounced tuning effect than the bendable tuning stubs 1140, 1160. The twistable tuning element 1000 may be simpler to use (i.e., it is easier to bend) and may be amenable to automatic tuning since the twistable tuning element 1000 only moves in one direction. The generally improved performance as compared to single-bend and double-bend tuning stubs 1140, 1160 is shown in FIGS. 24A through 26C, which are cross-sectional and perspective views of various simulated performance parameters for the three different types of tuning elements.

Figure 24A:
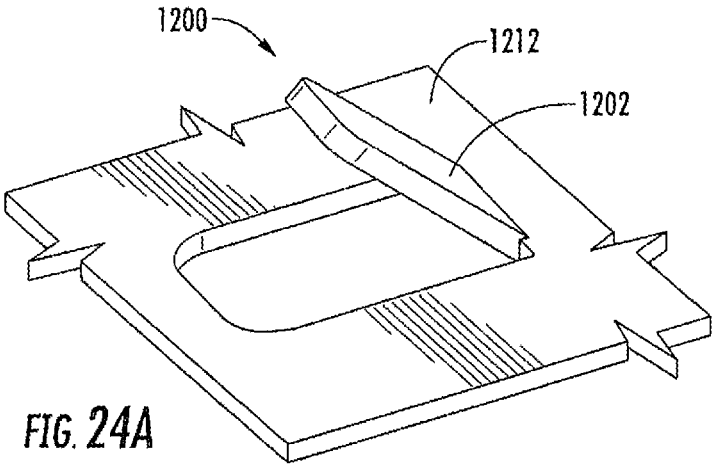
FIGS. 24A-C are schematic views illustrating the simulated current distribution in respectively, a single-bend stub tuning element, a double-bend stub tuning element and a twistable tuning element according to embodiments of the present invention.
Figure 24B:
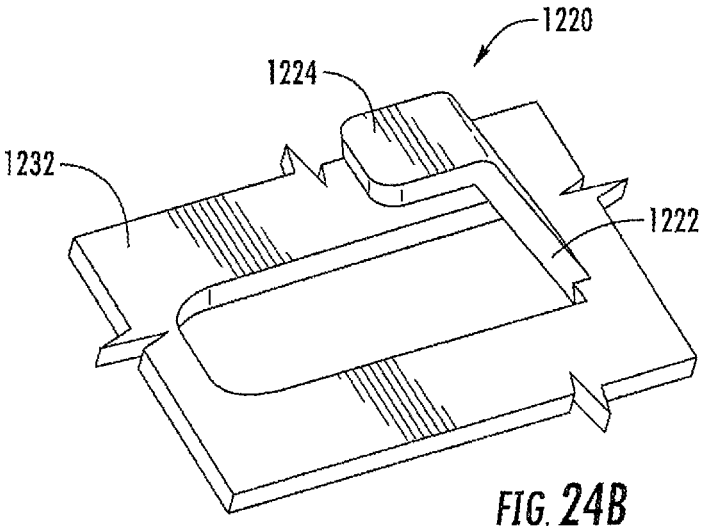
Figure 24C:
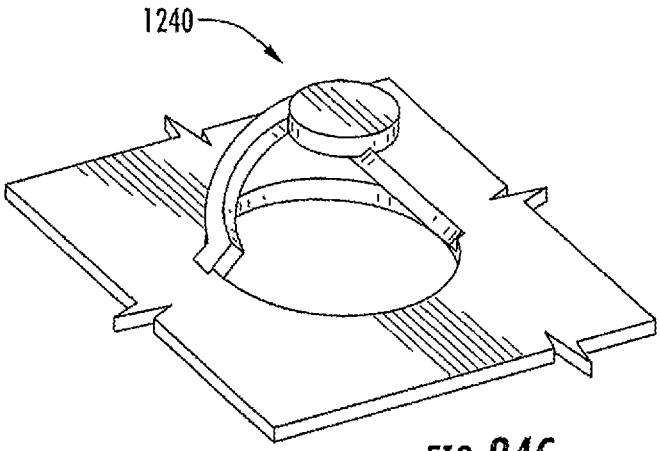
Figure 25A:
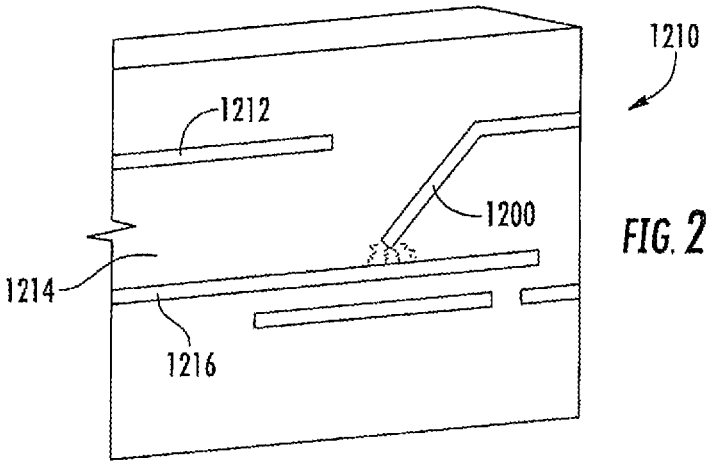
FIGS. 25A-C are cross-sectional views of the tuning elements of FIGS. 24A-24C, respectively, that illustrate the electric fields along the respective cross-sections.
Figure 25B:
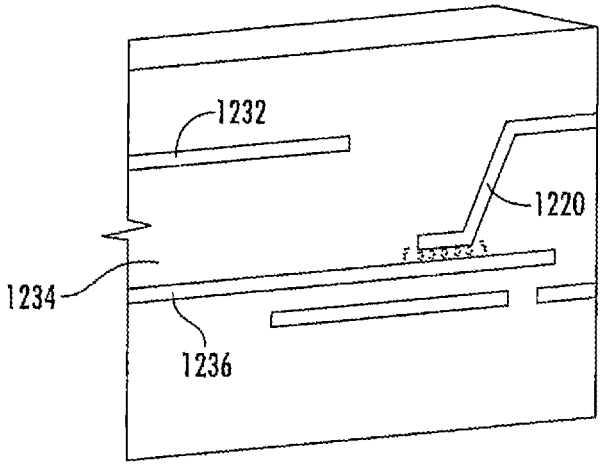
Figure 25C:
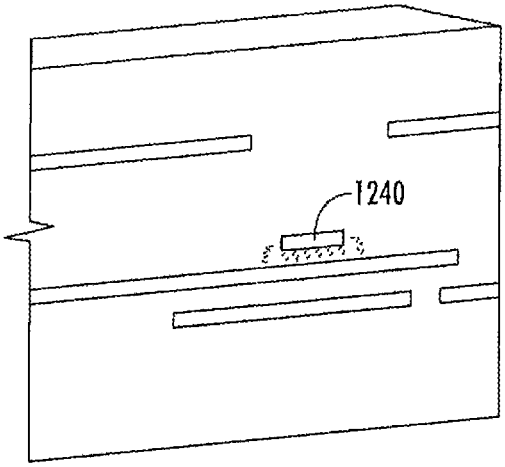

In particular, turning first to FIGS. 24A-24C, schematic views are provided of a single-bend tuning stub 1200, a double-bend tuning stub 1220 and a twistable tuning element 1240 according to embodiments of the present invention that were used in the simulations. As shown in FIG. 24A, the single-bend tuning stub 1200 comprised a cantilevered finger 1202 that was formed by making a U-shaped cut in a wall 1212 of a filter 1210 (see FIG. 25A). The cantilevered finger 1202 was bent downwardly into a cavity 1214 of the filter 1210, as can be seen in FIG. 25A. Referring to FIGS. 24B and 25B, the double-bend tuning stub 1220 comprises a cantilevered finger 1222 that was formed by making a U-shaped cut in a wall 1232 of a filter 1230. The cantilevered finger 1222 may be longer than the cantilevered finger 1202. The cantilevered finger 1222 was bent downwardly into a cavity 1234 of the filter 1230, and another bend was added near the distal end 1224 of the cantilevered finger 1222 so that the distal end of the double-bend tuning stub 1220 would extend generally parallel to the plane defined by the wall 1232. Referring to FIGS. 24C and 25C, the twistable tuning element 1240 has the design of the twistable tuning element 1000 that is described above.

FIGS. 25A-25C are cross-sectional views of the tuning elements of FIGS. 24A-24C, respectively, that illustrate the electric fields along the respective cross-sections. As shown in FIG. 25, the single-bend tuning stub 1200 only capacitively couples to a relatively small degree with the underlying resonator plate 1216, since only the distal end of the single-bend tuning stub 1200 element is in close proximity to the resonator plate 1216. The double-bend tuning stub 1220 exhibits increased capacitive coupling. However, the double-bend tuning screw 1220 may not be axially aligned with the opening 1238 in the cover 1232, as the degree of axial alignment is a function of how far the double-bend tuning stub 1220 is bent downwardly into the cavity 1234. In contrast, as shown in FIG. 25C, the twistable tuning element 1240 exhibits both a high degree of axial alignment with the opening in the filter wall as well as a high degree of capacitive coupling.

Figure 26A:
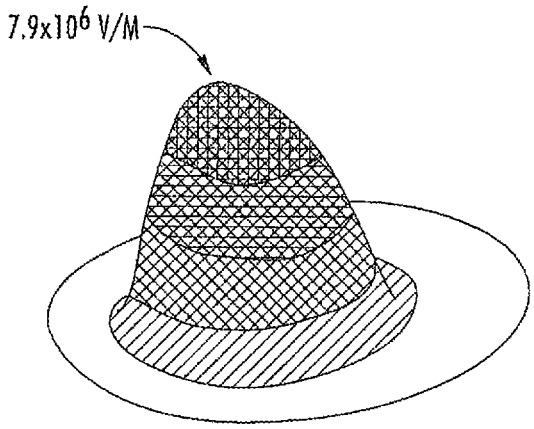
FIGS. 26A-C are perspective views of the electric field above the tuning element outside the filter housing for the tuning stubs of FIGS. 24A-24C, respectively.
Figure 26B:
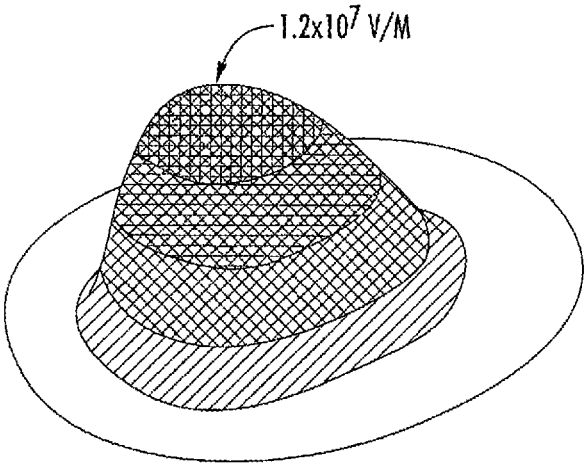
Figure 26C:
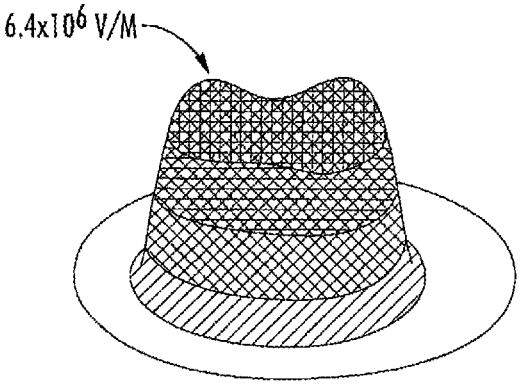

Another measure of the performance of a tuning element for a resonant cavity filter is the amount of electromagnetic radiation that escapes through the tuning element structure. FIGS. 26A-26C are perspective views of the electric field above the tuning elements of FIGS. 24A-24C, respectively, outside the filter housing, that illustrate this performance parameter. As shown in FIG. 26A, the single-bend tuning stub 1200 exhibits a fairly large amount of leakage, with the electric field reaching a peak strength of $7.88\times10^6$ V/m. As shown in FIG. 26B, the double-bend tuning stub 1220 exhibits even more leakage, with the electric field reaching a peak strength of $1.24\times10^7$ V/m. As shown in FIG. 26C, the twistable tuning element 1240 exhibits the least amount of leakage, with the electric field reaching a peak strength of $6.36\times10^6$ V/m. This leakage is only about half the leakage of the double-bend tuning stub 1220.

Figure 27:
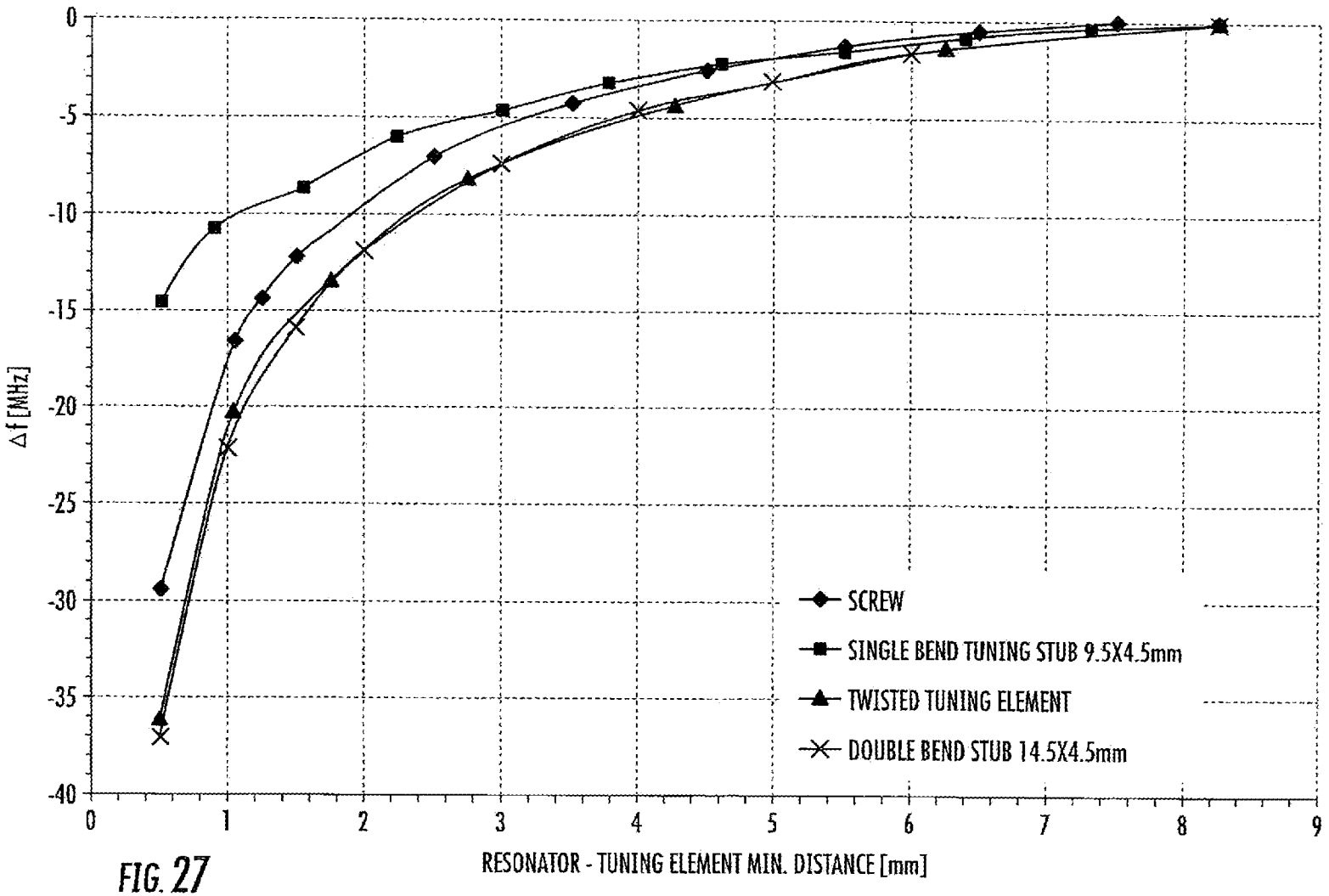
FIG. 27 is a graph comparing the resonant frequency tuning range of a twistable tuning element according to embodiments of the present invention as compared to a conventional tuning screw and to conventional single-bend and double-bend tuning stubs.

FIG. 27 is a graph comparing the resonant frequency tuning range of a twistable tuning element according to embodiments of the present invention as compared to a conventional tuning screw and to conventional single-bend and double-bend tuning stubs. The results in FIG. 27 were obtained via simulation. As shown in FIG. 27, the amount that the resonant frequency of the filter is tuned is a function of the minimum distance between the tuning element at issue and an underlying resonator plate. In the example, the resonator plate was positioned 8.25 mm beneath the top cover that includes the various tuning elements. For the simulation, each tuning element was displaced downwardly toward the resonator plate with distances ranging from no displacement (corresponding to a horizontal axis value of 8.25 mm) to a distance of 7.75 mm (corresponding to a horizontal axis value of 0.5 mm).

As can be seen in the graph of FIG. 27, the double-bend tuning stub 1220 and the twistable tuning element 1240 exhibit the greatest amount of tuning range, each being able to tune the resonant frequency by more than 35 MHz. The resonant frequency tuning performance of these two types of tuning elements is essentially identical, as shown in FIG. 27, but as discussed above, the twistable tuning element 1240 has various advantages over the double-bend tuning stub 1220 in terms of ease of use, amenability to automatic tuning, electromagnetic radiation leakage performance, and PIM distortion performance. The tuning screw also provides a relatively large resonant frequency tuning range, but still not as good as the twistable tuning element 1240 and with various other disadvantages, as discussed above. The single-bend tuning element 1200 only provides a limited resonant frequency tuning range (less than half the tuning range of the twistable tuning element 1240), and has numerous other disadvantages as set forth above.

Figure 28:
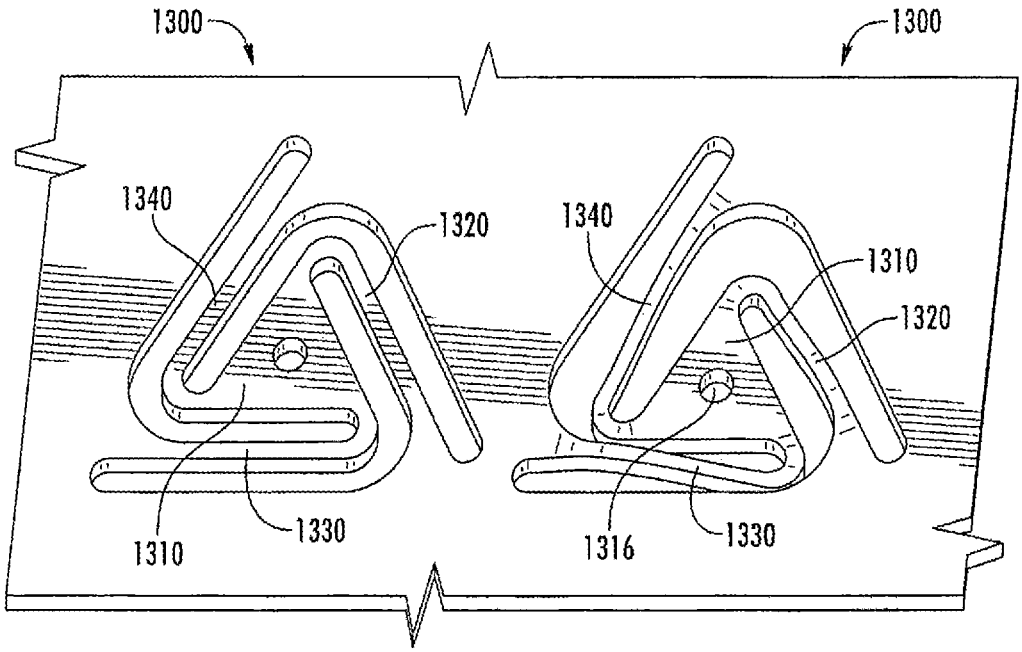
FIG. 28 is a top view of a twistable tuning element for a filter according to further embodiments of the present invention.

FIG. 28 is a top view of a plurality of twistable tuning elements 1300 for a filter according to further embodiments of the present invention. As shown in FIG. 28, each twistable tuning element 1300 includes a coupling element 1310 and three arms 1320, 1330, 1340. The twistable tuning element 1300 may be formed by cutting three generally V-shaped cuts in a metal sheet. The arms 1320, 1330, 1340 are formed between the legs of adjacent V-shaped cuts. The coupling element 1310 may include a hole 1316 therein. In the depicted embodiment, the coupling element 1310 has a generally triangular shape, although other shapes may be used. The twistable tuning element 1300 will operate in the same manner as the twistable tuning element 1000 that is described above, except that the twistable tuning element 1300 is supported by three arms instead of two.

As discussed above, the filter assemblies according to embodiments of the present invention include input/output ports such as, for example, the pair of individual ports 170, 180 and a common port 190 included on filter assembly 100. As is also discussed above, the input/output ports may be designed to receive a cable or, alternatively, may be implemented as coaxial connector ports that are designed to mate with a connectorized coaxial cable.

In various prior art RF devices that receive coaxial cables, a flange plate and gasket may be used to mate a coaxial connector to the face of the housing of the RF device. When such an approach is used, the mating point between the coaxial connector and the housing may become a source for moisture ingress into the RF filter housing as the gasket ages, particularly when the coaxial connector and RF device are used in an outdoor environment. Such moisture may corrode and decrease the performance of electrical components in the RF device and/or the coaxial connector.

Pursuant to further embodiments of the present invention, the filter assemblies disclosed herein may include housings that have the outer shell of coaxial connectors die-cast therein so as to comprise a monolithic unit, thereby eliminating the need for the flange plate and gasket used to conventionally mate a coaxial connector to an RF device. Eliminating the flange plate and gasket may reduce both the size and weight of the resulting apparatus while also eliminating a point entry where moisture may intrude into the RF filter and/or coaxial connector. Embodiments of the present invention that include such integrated connectors are described below with respect to a 4.3-10 coaxial connector for purposes of illustration. It will be understood, however, that embodiments of the present invention are not limited to a single coaxial connector type as multiple types of coaxial connectors can be used in accordance with various embodiments.

Figure 29:
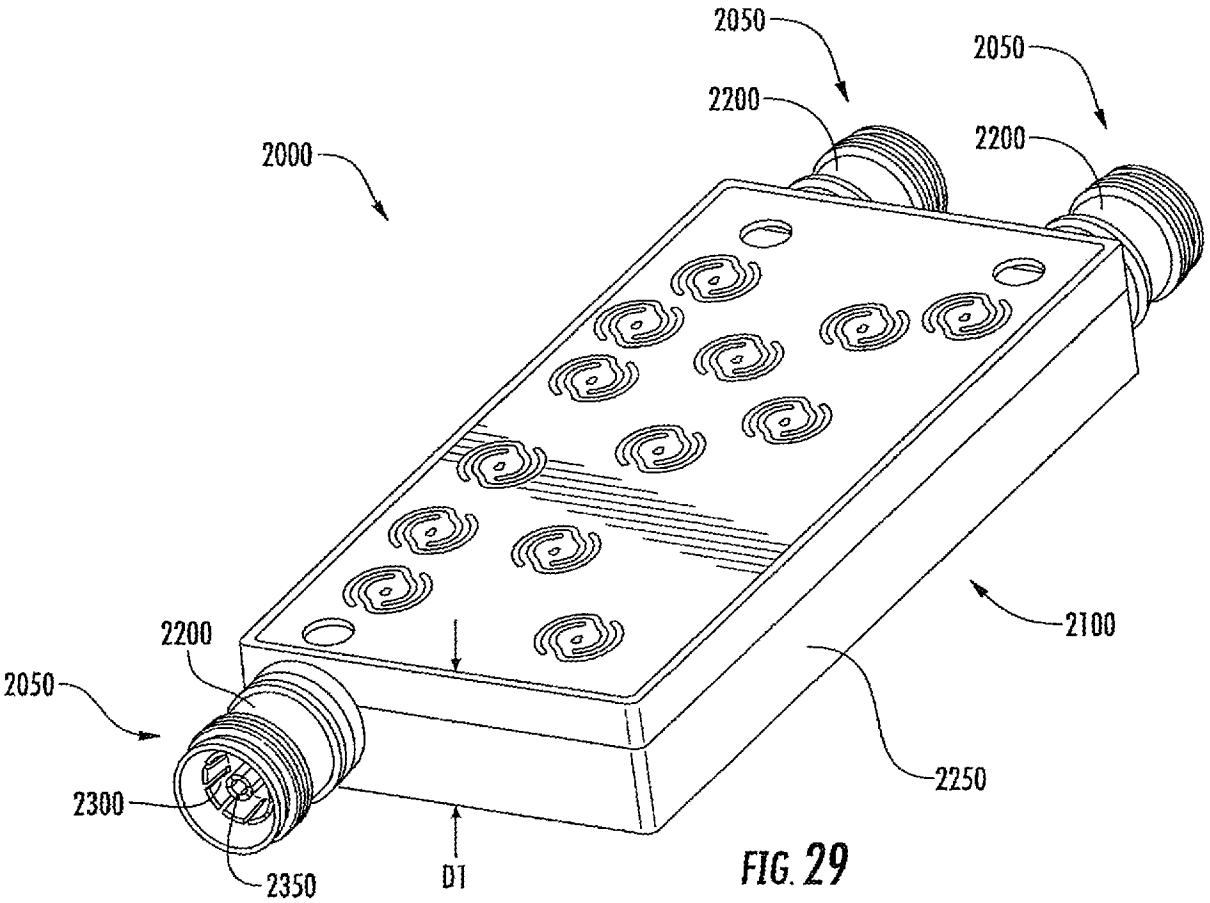
FIG. 29 is a perspective view of a filter assembly according to some embodiments of the present invention that has a housing in which the outer shells of the coaxial connectors are cast as part of the housing to provide a monolithic unit.

FIG. 29 is a perspective view of a filter assembly 2000 according to some embodiments of the present invention that has a housing in which the outer shells of the coaxial connectors are cast as part of the housing to provide a monolithic unit. As shown in FIG. 29, the filter assembly 2000 includes coaxial connectors 2050 and an RF filter 2100. The coaxial connectors 2050 may each be a 4.3-10 type coaxial connector that is configured to carry RF signals and an outer shell 2200. A female type coaxial connector 2050 is illustrated in FIG. 29 that comprises an outer conducting portion 2300 configured as individual conductive fingers, which are biased to compress a corresponding male type coaxial connector and an inner conducting portion 2350 that is configured to receive a probe element from the corresponding male type coaxial connector. The RF filter 2100 comprises an RF filter circuit within an outer housing 2250. The RF filter circuit is communicatively coupled to the coaxial connector 2050. In addition, the outer shells 2200 of the coaxial connectors 2050 are die-cast with the outer housing 2250 of the RF filter 2100 so as to comprise a monolithic unit. By casting the outer housing 2250 of the RF filter 2100 with the outer shells 2200 of the coaxial connectors 2050, the flange and gasket used to conventionally attach a coaxial connector can be eliminated. This may reduce both the size and weight of the resulting assembly. As shown in FIG. 29, a height D1 of the end face of the outer housing 2250 of the RF filter 2100 may be approximately equal to an outer diameter of one of the coaxial connectors 2050. For example, for a 4.3-10 type coaxial connector 2050, the height D1 may be approximately 21.8 mm as compared to a height of approximately 33.8 mm if a conventional flange and gasket connection was used.

The RF filter 2100 may be, but is not limited to, a bandpass filter, bandstop filter, low pass filter, or high pass filter. The material used to die-cast the outer shell(s) 2200 of the coaxial connector(s) 2050 and outer housing 2250 of the RF filter 2100 may be, for example, aluminum and/or magnesium. The selection of the material for die-casting the outer shell(s) 2200 of the coaxial connector(s) 2050 and outer housing 2250 of the RF filter 2100 may be based on a particular intended operating environment for the filter assembly 2000. Thus, in some embodiments, a material having a durometer value greater than a defined threshold may be used to die-cast the outer shell(s) 2200 of the coaxial connector(s) 2050 and outer housing 2250 of the RF filter 2100.

While shown in FIG. 29 with two coaxial connectors 2050 at one end of the RF filter 2100 and one coaxial connector at an opposing end of the RF filter 2100, it will be understood that a single coaxial connector 2050 may be formed at one end of the RF filter 2100 and a single coaxial connector 2050 may be formed at the opposing end of the RF filter

2100, a single coaxial connector 2050 may be formed at one end of the RF filter 2100 and a plurality of coaxial connectors 2050 may be formed at the opposing end of the RF filter 2100, and/or a plurality of coaxial connectors 2050 may be formed at one end of the RF filter 2100 and a plurality of coaxial connectors may be formed at the opposing end of the RF filter 2100 in accordance with various embodiments. Other arrangements are possible, including placing one or more coaxial connectors on the sidewalls of the filter assembly 2000.

Figure 30:
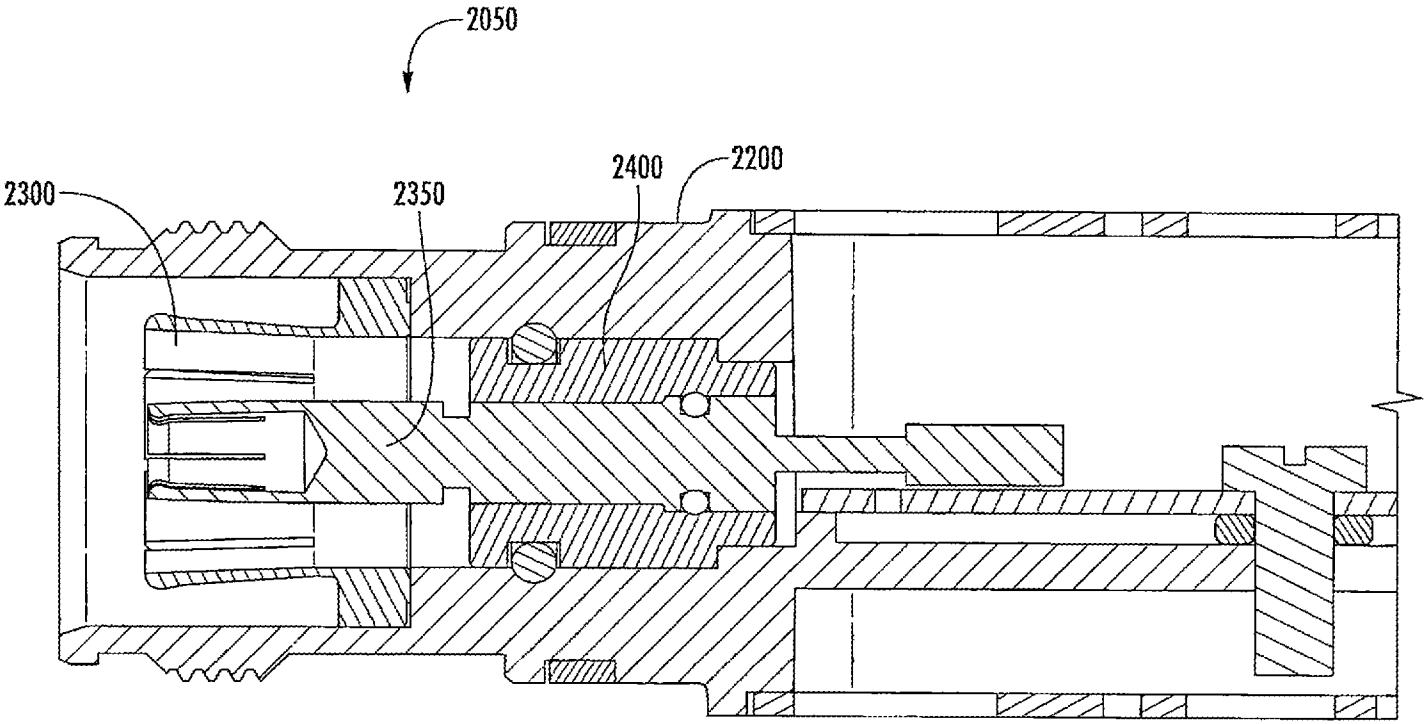
FIG. 30 is a cross sectional diagram of the coaxial connector of FIG. 29.

FIG. 30 is a cross sectional diagram of the coaxial connector 2050 of FIG. 29. As shown in FIG. 30, the outer conducting portion 2300 and the inner conducting portion 2350 provide a conductive path to the RF filter 2100. A dielectric shield 2400 is formed around the inner conducting portion 2350 in the body of the coaxial connector 2050. The outer housing 2250 of the RF filter 2100 and the outer shell 2200 of the coaxial connector 2050 are cast together so as to comprise a monolithic unit.

Figure 31:
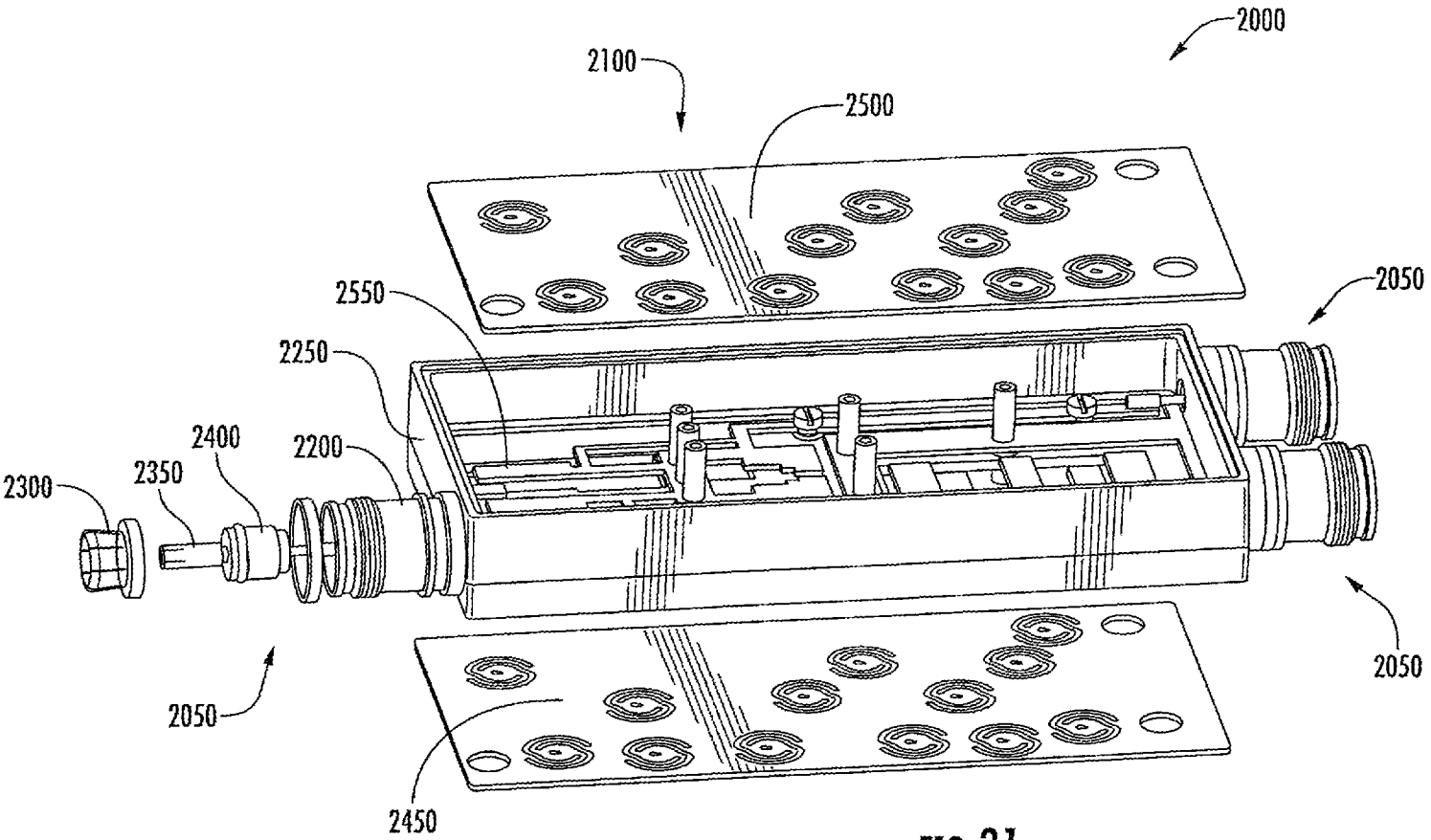
FIG. 31 is an exploded, perspective diagram of the apparatus of FIG. 29.

FIG. 31 is an exploded, perspective diagram of the apparatus of FIG. 29. As shown in FIG. 31, the outer housing 2250 of the RF filter 2100 is cast together with the outer shell 2200 of the coaxial connector 2050 to comprise a monolithic unit. To complete the assembly of the coaxial connector 2050, the outer conducting portion 2300, the inner conducting portion 2350, and the dielectric shield 2400 may be assembled as shown. The upper and lower panels 2450 and 2500 are removed from the RF filter 2100 to reveal the RF filter circuit 2550 within the outer housing 2250 of the RF filter 2100. The RF filter circuit 2550 is communicatively coupled to the conducting portion 2150 (e.g., outer conducting portion 2300 and inner conducting portion 2350) of the coaxial connector 2050. It will be appreciated that any of the filters according to embodiments of the present invention that include ports that receive cables or connectors may implement those ports using the approach illustrated with respect to FIGS. 29-31.

The above-described tuning elements according to embodiments of the present invention may be formed by punching or cutting the metal sheets that are used to form the housing of the filter, and hence do not require any additional parts. Moreover, while the above-described tuning elements are highly suitable for filters having sheet metal housings and/or covers, it will be appreciated that the tuning elements described herein may be used in other applications, including filters having housings/covers that are formed of materials other than sheet metal, and/or as internal tuning elements.

The twistable tuning elements according to embodiments of the present invention may be significantly cheaper than conventional tuning screws, and will not generate metal shavings or debris or exhibit poor metal-to-metal contacts that can give rise to passive intermodulation interference as is the case with filters that use tuning screws. The twistable tuning elements according to embodiments of the present invention also outperform conventional bendable tuning stubs in that they are easier to move for tuning, exhibit low electromagnetic radiations levels, are mechanically rigid and vibration resistant, have a high tuning range, and may be designed to provide the tuning capacitance exactly where it is needed.

The present invention has been described above with reference to the accompanying drawings, in which certain embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that when an element (e.g., a device, circuit, etc.) is referred to as being "connected" or "coupled" to another element, it can be directly connected or coupled to the other element or intervening elements may be present. In contrast, when an element is referred to as being "directly connected" or "directly coupled" to another element, there are no intervening elements present.

It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A filter assembly comprising:

a housing having a top cover, a bottom cover, and a frame that has at least one sidewall, wherein the top cover, the bottom cover and the at least one sidewall define an internal cavity, and wherein the housing is configured to receive a plurality of radio frequency ("RF") transmission lines; and a resonator plate mounted at least partially within the internal cavity of the housing, the resonator plate comprising a first conductive layer comprising at least one resonator, wherein a first type of solder having a first melting point [is used to solder] *attaches* the resonator plate to the [housing] *frame*, and wherein a second type of solder having a second melting point that is lower than the first melting point [is used to solder] *attaches* the top cover and/or the bottom cover to the [housing] *frame*.

2. The filter assembly of claim 1, wherein the resonator plate comprises a printed circuit board.

3. The filter assembly of claim 2, wherein the at least one resonator is attached to the printed circuit board.

4. The filter assembly of claim 1, wherein the first conductive layer comprises a plurality of openings that form a hole pattern.

5. The filter assembly of claim 1, wherein the resonator plate is soldered to the housing via a first continuous solder joint that extends around an internal periphery of the housing.

6. The filter assembly of claim 1, wherein the resonator plate is [soldered] *attached* to an internal ledge *of the frame, the internal ledge* extending from the *at least one* sidewall of the [housing] *frame*.

7. The filter assembly of claim 6, wherein the resonator plate comprises a metal border on a face of the resonator plate to facilitate soldering the resonator plate to the internal ledge.

8. The filter assembly of claim 1, wherein at least one of the top cover or the bottom cover comprises an integral tuning element.

9. The filter assembly of claim 1, wherein the resonator plate comprises a second conductive layer on a side of the resonator plate that is opposite the first conductive layer.

10. A filter assembly comprising:

a housing having a top cover, a bottom cover, and a sidewall, the top cover, the bottom cover and the sidewall defining an internal cavity; and a printed circuit board mounted at least partially within the housing, the printed circuit board comprising a conductive layer that comprises a plurality of resonating elements that form part of a resonant cavity filter, wherein the sidewall comprises a slot, and wherein a portion of the printed circuit board extends through the slot to reside outside the housing, wherein at least one of the top cover or the bottom cover comprises an integral tuning element.

11. The filter assembly of claim 10, wherein a phase shifter assembly is provided on the printed circuit board.

12. The filter assembly of claim 11, wherein the printed circuit board further comprises a plurality of radio frequency ("RF") transmission lines that extend from outside the housing to inside the housing.

13. A filter assembly comprising:

a housing having a top cover, a bottom cover, and a frame that includes at least one sidewall, wherein the top cover, the bottom cover and the at least one sidewall define an internal cavity;

a plurality of resonators in the internal cavity; and a twistable tuning element that is integral with the top cover, wherein at least one of the plurality of resonators includes a narrow base and a widened distal end, and wherein the plurality of resonators are integral with the frame and aligned in a first plane that is parallel to a plane defined by the top cover.

14. The filter assembly of claim 13, wherein the bottom cover is integral with the frame.

15. The filter assembly of claim 13, wherein the top cover is attached to the frame via a continuous solder joint that extends all the way around a periphery of the frame.

16. The filter assembly of claim 13, wherein the twistable tuning element includes a first arm, a second arm and a coupling element, wherein the coupling element is configured to rotate as the coupling element is displaced into the internal cavity.

17. The filter assembly of claim 16, wherein the twistable tuning element includes a total of two or three arms.

18. A filter assembly, comprising[;] *:* a housing that defines an internal cavity, the housing comprising at least one cover *and a frame*; and a substantially planar metal resonator plate mounted within the internal cavity, the substantially planar metal resonator plate comprising a conductive layer comprising at least one resonator,

[wherein at least the conductive layer and a size and shape of the internal cavity are configured to achieve a pre-selected filter response, and]

wherein a first type of solder having a first melting point [is used to solder] *attaches* the substantially planar metal resonator plate to the [housing] *frame*, and wherein a second type of solder having a second melting point that is lower than the first melting point [is used to solder] *attaches* the at least one cover to the [housing] *frame*.

19. The filter assembly of claim 18, wherein the substantially planar metal resonator plate comprises a printed circuit board.

20. The filter assembly of claim 18, wherein the substantially planar metal resonator plate is [soldered] *attached* to an internal ledge *of the frame, the internal ledge* extending from a sidewall of the [housing] *frame*.

* * * * *